US011740823B2

(12) United States Patent
Deguchi et al.

(10) Patent No.: US 11,740,823 B2
(45) Date of Patent: Aug. 29, 2023

(54) STORAGE SYSTEM AND STORAGE CONTROL METHOD

(71) Applicant: HITACHI, LTD., Tokyo (JP)

(72) Inventors: Akira Deguchi, Tokyo (JP); Hirotaka Nakagawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/569,202

(22) Filed: Sep. 12, 2019

(65) Prior Publication Data
US 2020/0117381 A1    Apr. 16, 2020

(30) Foreign Application Priority Data
Oct. 10, 2018  (JP) .................................. 2018-192144

(51) Int. Cl.
*G06F 3/06* (2006.01)

(52) U.S. Cl.
CPC .......... *G06F 3/0644* (2013.01); *G06F 3/0608* (2013.01); *G06F 3/0647* (2013.01); *G06F 3/0653* (2013.01); *G06F 3/0665* (2013.01); *G06F 3/0683* (2013.01)

(58) Field of Classification Search
CPC .... G06F 3/0644; G06F 3/0608; G06F 3/0647; G06F 3/0653; G06F 3/0665; G06F 3/0683
See application file for complete search history.

(56) References Cited

U.S. PATENT DOCUMENTS

| 8,782,371 | B2* | 7/2014 | Prebble | G06F 12/08 |
| | | | | 711/170 |
| 10,089,145 | B1* | 10/2018 | Priescu | G06F 3/067 |
| 2002/0069338 | A1* | 6/2002 | Ozdemir | G06F 12/023 |
| | | | | 711/171 |
| 2004/0221120 | A1* | 11/2004 | Abrashkevich | G06F 12/023 |
| | | | | 711/170 |

(Continued)

FOREIGN PATENT DOCUMENTS

| JP | 2012-073825 A | 4/2012 |
| JP | 2016-192170 A | 11/2016 |

(Continued)

OTHER PUBLICATIONS

Japanese Office Action dated Jul. 28, 2020 for Japanese Patent Application No. 2018-192144.

*Primary Examiner* — Prasith Thammavong
(74) *Attorney, Agent, or Firm* — Volpe Koenig

(57) ABSTRACT

In a multi-node storage system, a node's capacity has an upper limit, and capacities provided by nodes are smaller than a capacity of a global pool. A volume having a capacity larger than the capacity of one node is created by the node. A write error occurs when an amount of data larger than the capacity of the node is written. A storage system reduces the frequency of such a write error. A global pool is based on a plurality of local pools of a plurality of storage nodes that constitute a node group. In any of the storage nodes, a capacity relationship is maintained where a used capacity of a volume created by the storage node is equal to or less than an available capacity of a local pool of the storage node. A storage management unit manages the node group and selects the storage node.

17 Claims, 21 Drawing Sheets

(56) References Cited

U.S. PATENT DOCUMENTS

| | | | |
|---|---|---|---|
| 2007/0118712 A1* | 5/2007 | van Riel | G06F 12/12 |
| | | | 711/170 |
| 2009/0125680 A1* | 5/2009 | Ninose | G06F 11/2082 |
| | | | 711/E12.001 |
| 2011/0191536 A1* | 8/2011 | Mizuno | G06F 3/0611 |
| | | | 711/114 |
| 2011/0246731 A1* | 10/2011 | Ninose | G06F 11/1466 |
| | | | 711/E12.002 |
| 2011/0264868 A1 | 10/2011 | Takata et al. | |
| 2012/0079226 A1 | 3/2012 | Kihara et al. | |
| 2012/0096289 A1* | 4/2012 | Kawakami | G06F 1/3268 |
| | | | 713/320 |
| 2014/0025924 A1 | 1/2014 | Satoyama et al. | |
| 2015/0052179 A1* | 2/2015 | Novick | G06F 3/0644 |
| | | | 707/827 |
| 2015/0160884 A1* | 6/2015 | Scales | G06F 3/0644 |
| | | | 711/114 |
| 2016/0291899 A1 | 10/2016 | Takamura et al. | |
| 2016/0306581 A1* | 10/2016 | Belgaied | G06F 3/0644 |
| 2018/0285016 A1 | 10/2018 | Akutsu et al. | |
| 2021/0072913 A1* | 3/2021 | Hardy | G06F 3/0644 |

FOREIGN PATENT DOCUMENTS

| | | | |
|---|---|---|---|
| WO | 2011/135617 A1 | 11/2011 | |
| WO | 2018/029820 A1 | 2/2018 | |

\* cited by examiner

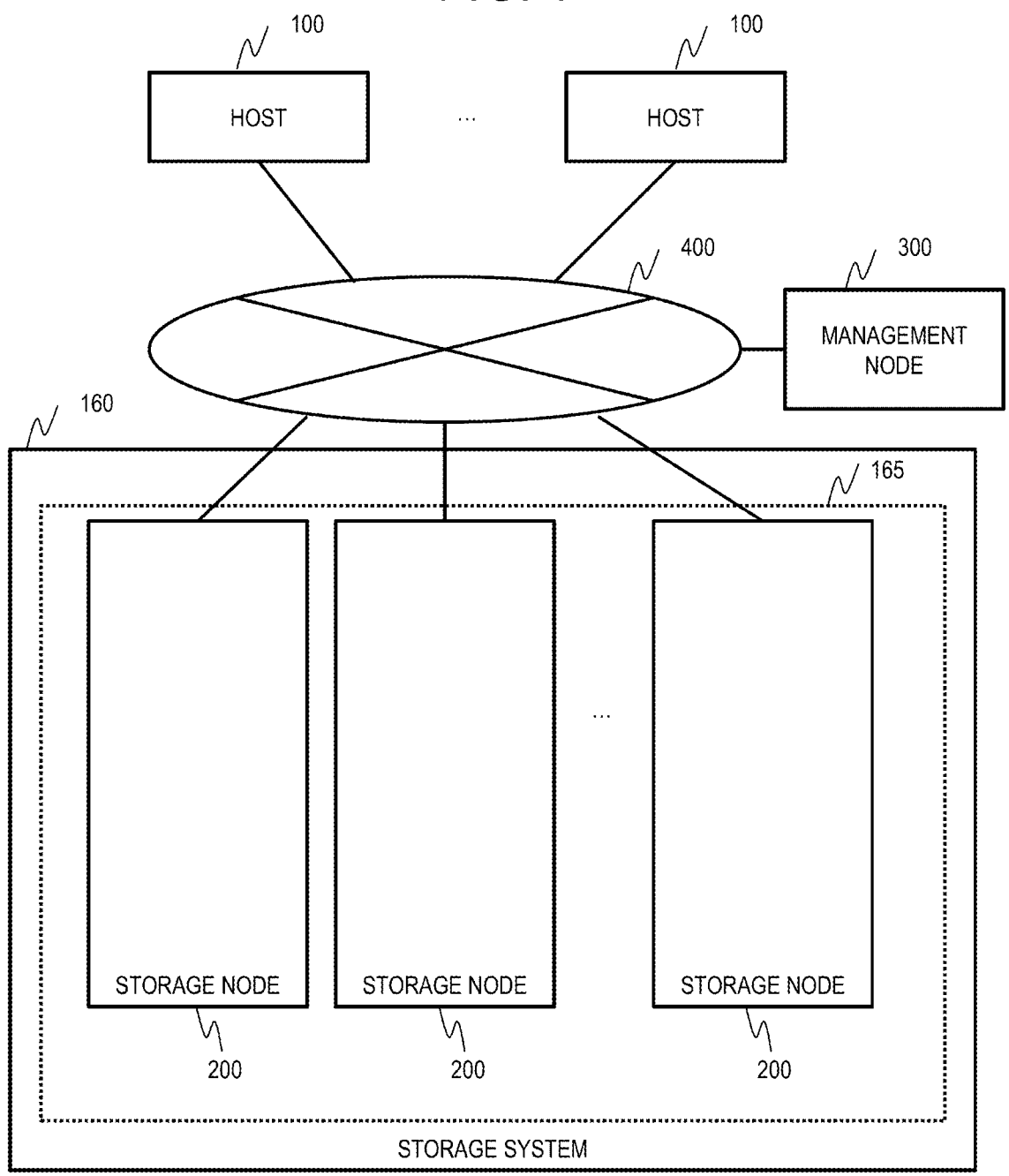

FIG. 4
PHYSICAL CHUNK TABLE
231

| PHYSICAL CHUNK NUMBER | STORAGE DEVICE NUMBER | IN-DEVICE OFFSETTING | SIZE (GB) |
| --- | --- | --- | --- |
| 0 | 0 | 0x0000 | 100 |
| 1 | 0 | 0x1000 | 100 |
| 2 | 0 | 0x2000 | 100 |
| 3 | 1 | 0x0000 | 100 |
| 4 | 1 | 0x1000 | 100 |
| ... | ... | ... | ... |

FIG. 5
LOGICAL CHUNK TABLE
232

| LOGICAL CHUNK NUMBER | NODE NUMBER (MASTER) | PHYSICAL CHUNK NUMBER (MASTER) | NODE NUMBER (MIRROR) | PHYSICAL CHUNK NUMBER (MIRROR) | SIZE (GB) | STORAGE CONTROL UNIT NUMBER |
| --- | --- | --- | --- | --- | --- | --- |
| 0 | 0 | 0 | 1 | 0 | 100 | 0 |
| 1 | 0 | 1 | 1 | 1 | 100 | 0 |
| 2 | 0 | 2 | 1 | 2 | 100 | 0 |
| ... | ... | ... | ... | ... | ... | ... |

FIG. 6
LOCAL POOL TABLE
228

| LOCAL POOL NUMBER (601) | CAPACITY (602) | USED CAPACITY (603) | LOGICAL CHUNK NUMBER (604) | PAGE NUMBER (605) | PAGE ALLOCATION STATE (606) | ALLOCATION DESTINATION VOLUME NUMBER (607) |
|---|---|---|---|---|---|---|
| 0 | 100TB | 10 TB | 0 | 0 | COMPLETED | 0 |
| | | | | 1 | COMPLETED | 0 |
| | | | | ... | ... | ... |
| | | | 1 | 10 | COMPLETED | 1 |
| | | | | 11 | COMPLETED | 2 |
| | | | | ... | ... | ... |
| | | | ... | ... | ... | ... |
| ... | ... | ... | ... | ... | ... | ... |

FIG. 7
STORAGE CONTROL UNIT TABLE
243

| STORAGE CONTROL UNIT NUMBER (701) | ACTIVE NODE NUMBER (702) | STANDBY NODE NUMBER (703) |
|---|---|---|
| 0 | 0 | 1 |
| 1 | 1 | 2 |
| 2 | 2 | 0 |
| ... | ... | ... |

FIG. 8

GLOBAL POOL TABLE
238

| GLOBAL POOL NUMBER /801 | CAPACITY /802 | USED CAPACITY /803 | STORAGE CONTROL UNIT NUMBER /804 | LOCAL POOL NUMBER /805 |
|---|---|---|---|---|
| 0 | 300TB | 100TB | 0 | 0 |
| | | | 1 | 0 |
| | | | ... | ... |
| ... | ... | ... | ... | ... |

FIG. 9
COMPARATIVE EXAMPLE
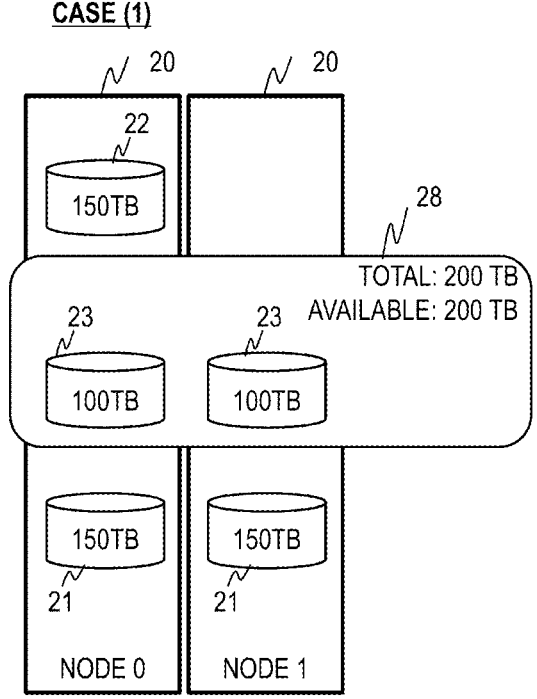
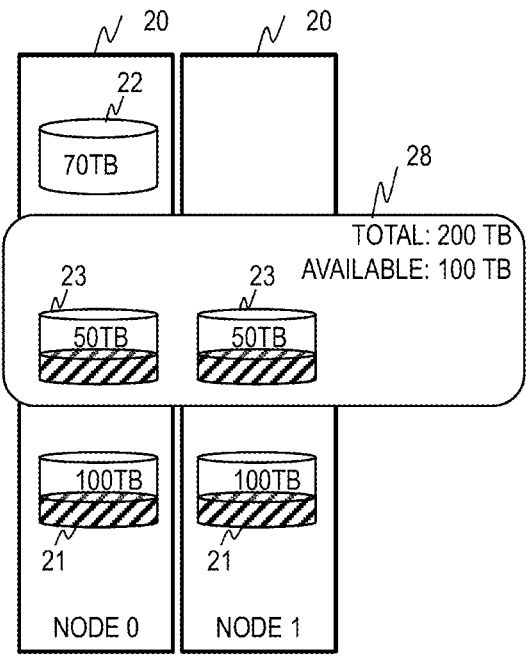
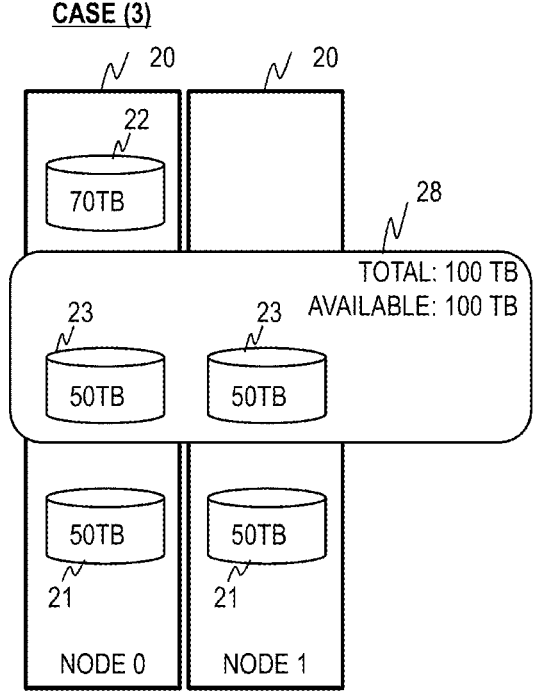
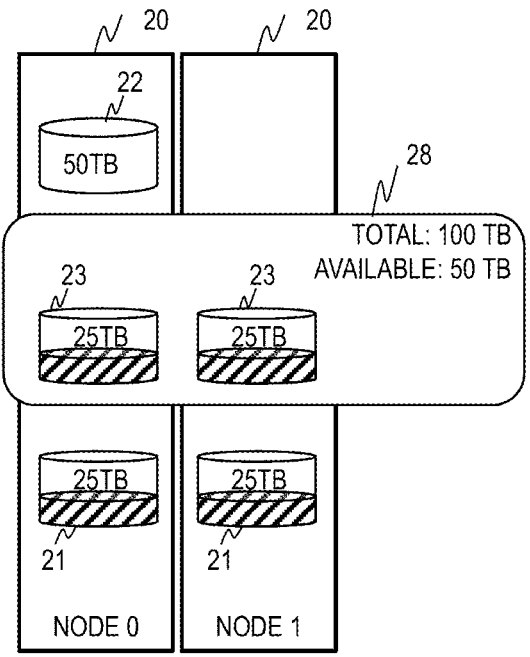

LOCAL HISTORY TABLE
239

| TIME | STORAGE CONTROL UNIT NUMBER 1201 | LOCAL POOL NUMBER 1202 | CAPACITY 1203 | USED CAPACITY 1204 | THE NUMBER OF REGISTERED CHUNKS 1205 | TOTAL VOLUME CAPACITY 1206 | INTERNAL CAPACITY 1207 1208 |
|---|---|---|---|---|---|---|---|
| 10:00 | 0 | 0 | 100TB | 50TB | 512 | 30TB | 100TB |
|  | 1 | 0 | 100TB | 30TB | 256 | 150TB | 100TB |
|  | ... | ... | ... | ... | ... | ... | ... |
| 11:01 | ... | ... | ... | ... | ... | ... | ... |

FIG. 22

COMBINED VOLUME TABLE
246

| COMBINED VOLUME NUMBER (2201) | COMBINED VOLUME CAPACITY (2202) | NODE NUMBER (2203) | VOLUME NUMBER (2204) | VOLUME CAPACITY (2205) |
|---|---|---|---|---|
| 0 | 300GB | 00 | 0 | 100 |
| | | 01 | 1 | 100 |
| | | 01 | 2 | 100 |
| 1 | 1 | 00 | 0 | 100 |
| ... | ... | ... | ... | ... |

STORAGE SYSTEM AND STORAGE CONTROL METHOD

BACKGROUND OF THE INVENTION

1. Field of the Invention

The present invention relates generally to a storage system and a control method for the same.

2. Description of the Related Art

In a computer system that handles a large amount of data, the data is managed by using a storage system that has a large capacity and is provided separately from a host computer which executes an application. The storage system is an apparatus that includes one or more physical drives (such as hard disk drives) and stores data written from the host computer.

In recent years, there is a storage system (hereinafter, referred to as a multi-node storage system) having a multi-node configuration in which a plurality of storage nodes are bundled to construct a storage system. Capacity and performance can be enhanced by adding a node, and thus the storage system is also referred to as a scale-out storage system. When storage software is installed and used in nodes that constitute a multi-node, each node becomes a software-defined storage node, and the multi-node storage system may be constructed as a software-defined storage system as a whole.

For example, a technique disclosed in US2014/0025924A1 can be applied to the multi-node storage system.

SUMMARY OF THE INVENTION

It is considered that a first technique and a second technique below are applied to the multi-node storage system.

The first technique is management technique of a global pool. The global pool is a logical storage area across a plurality of nodes. A capacity of the global pool is a total value of a plurality of capacities of the plurality of nodes. According to the first technique, a user can use a storage system without being aware of the individual nodes.

In the second technique, data in a volume that serves as a storage area recognized by a host is stored in a node. According to the second technique, when data is read from the volume, communication between nodes is not necessary. As a result, high read performance can be realized. In order to protect data, duplication of data and parity data may be stored in another node.

In the multi-node storage system to which the above first and second techniques are applied, a capacity that can be provided by one node has an upper limit, and the capacities that can be provided by the nodes are smaller than the capacity of the global pool. A volume having a capacity larger than the capacity that can be provided by one node is created by the node, and when data of an amount larger than the capacity that can be provided by the node is written, a write error occurs.

Provided is a storage system. A global pool is based on a plurality of local pools of a plurality of storage nodes that constitute a node group. In any of the storage nodes, a capacity relationship is maintained in which a used capacity of a volume created by the storage node is equal to or less than an available capacity of a local pool of the storage node. The storage node that creates a volume is selected by a storage management unit that manages the node group.

It is possible to reduce the frequency of a write error in a multi-node storage system.

BRIEF DESCRIPTION OF THE DRAWINGS

FIG. 1 shows a configuration of a computer system according to an embodiment of the invention;

FIG. 4 shows an example of a physical chunk table;

FIG. 5 shows an example of a logical chunk table;

FIG. 6 shows an example of a local pool table;

FIG. 7 shows an example of a storage control unit table;

FIG. 8 shows an example of a global pool table;

FIG. 9 shows a problem that may occur in a comparative example;

FIG. 22 shows an example of a combined volume table; and

DESCRIPTION OF THE PREFERRED EMBODIMENTS

Figure 2A:
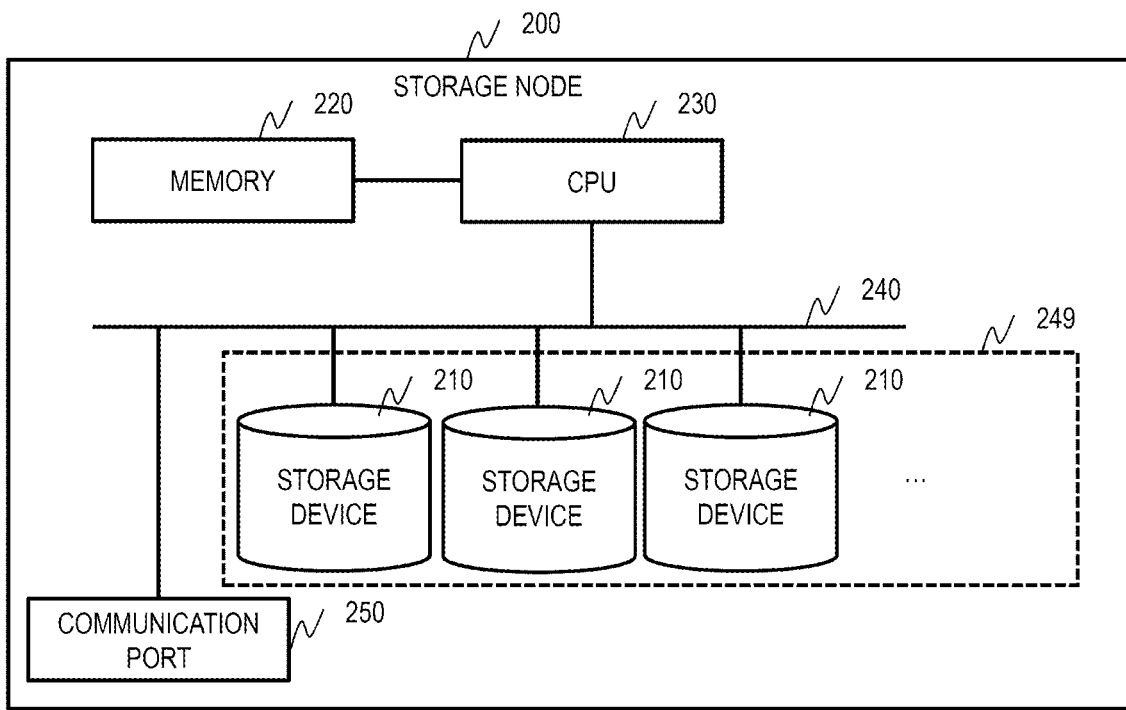
FIG. 2A shows a configuration of a storage node.

In the following description, an "interface unit" may be one or more interfaces. The one or more interfaces may be one or more communication interface devices of the same kind (for example, one or more Network Interface Cards (NICs)), or be two or more communication interface devices of different kinds (for example, a NIC and a Host Bus Adapter (HBA)).

In the following description, a "memory unit" includes one or more memories and may typically be a main storage device.

Also, in the following description, a "storage device unit" includes one or more storage devices and may typically be an auxiliary storage device. The "storage device", as an example of a storage device, particularly means a physical storage device, and is typically a non-volatile storage device.

In the following description, a "storage unit" includes at least one of the memory unit and at least a part of the storage device unit (typically, at least a memory unit).

In the following description, a "processor unit" includes one or more processors. At least one processor is typically a microprocessor such as a Central Processing Unit (CPU). Alternatively, other types of processors such as a Graphics Processing Unit (GPU) may also be used. At least one processor may be of a single core or a multi-core. At least one processor may be a processor in a broad sense such as a hardware circuit (for example, a Field-Programmable Gate Array (FPGA) or an Application Specific Integrated Circuit (ASIC)) that performs a part or all of the processing.

In the following description, an expression "xxx table" may be used to describe information that can be acquired as an output for an input. However, this type of information may be data of any structure or a learning model such as a neural network that generates an output for an input. Therefore, the "xxx table" can be referred to as "xxx information". In the following description, the configuration of each table is an example. One table may be divided into two or more tables, and all or a part of two or more tables may be one table.

In the following description, an expression "kkk unit" (except the interface unit, the storage unit and the processor unit) may be used to describe a function. However, the function may be realized by the processor unit by executing one or more computer programs, or realized by one or more hardware circuits (for example, the FPGA or the ASIC). When the function is realized by the processor unit by executing the programs, determined processing may be performed by using the storage unit and/or the interface unit or the like as appropriate, so that the function may at least partially belong to the processor unit. The processing described using the function (or the programs) as a subject may be performed by the processor unit or an apparatus including the processor unit. The programs may be installed from a program source. The program source may be, for example, a program distribution computer or a computer-readable recording medium (for example, a non-transitory recording medium). The description of each function is an example, and a plurality of functions may be combined into one function, or one function may be divided into a plurality of functions.

In the following description, a "storage system" includes a node group (for example, a distributed system) having a multi-node configuration. The node group includes a plurality of storage nodes each including the storage device unit. The storage nodes may be each a storage apparatus including one or more Redundant Array of Independent (or Inexpensive) Disks (RAID) groups, and typically a general-purpose computer. With one or more computers executing corresponding predetermined software, the one or more computers may be constructed as Software-Defined anything (SDx). As the SDx, for example, Software Defined Storage (SDS) or Software Defined Datacenter (SDDC) can be used. For example, when software having a storage function is separately executed by one or more general-purpose computers, a storage system serving as the SDS may be constructed. At least one computer may execute one or more virtual computers serving as host computers and a virtual computer serving as a storage control system (typically, an apparatus that inputs data to the storage device unit and outputs data therefrom in response to an I/O request) of the storage system.

In the following description, reference numerals may be used when the same kind of elements are described without being distinguished from each other, and identification numbers of elements may be used when the same kind of elements are distinguished and described. For example, when being described without being distinguished, a storage node may be described as a "storage node 200", and when being distinguished and described, an individual storage node may be described as a "storage node 0" or a "storage node 1".

Hereinafter, an embodiment will be described.

Figure 20:
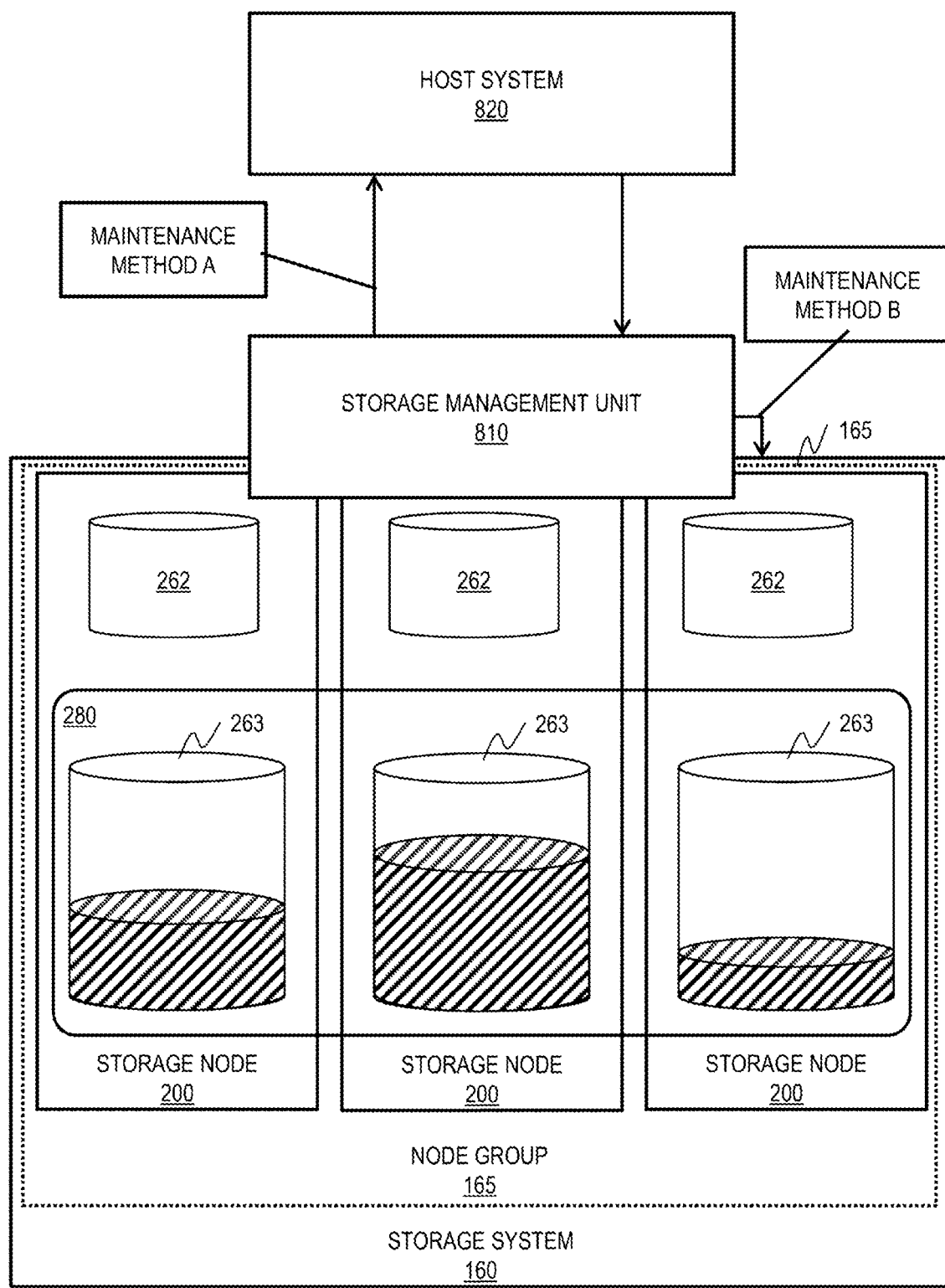
FIG. 20 shows an outline according to the embodiment of the invention.

FIG. 20 shows an outline according to the embodiment.

A storage system 160 includes a node group 165. The node group 165 includes a plurality of storage nodes 200. A storage node may be simply referred to as a "node". The plurality of storage nodes 200 include each a local pool 263 based on a storage device unit in the storage nodes 200. The plurality of storage nodes 200 provide a global pool 280 that is a logical storage area based on a plurality of local pools 263.

Each storage node 200 stores data, which is stored in a volume 262 provided to a host system 820 of the storage system 160, in a local pool 263 in the storage node 200. The host system 820 is an application program or a host system that executes the application program, and issues an input/output (I/O) request for specifying the volume 262.

A capacity relationship is maintained in which a used capacity of the volume 262 created by the storage node 200 is equal to or less than an available capacity of the local pool 263 in the storage node 200. Accordingly, frequency of a write error can be reduced.

Specifically, in the present embodiment, one of a maintenance method A for maintaining the above capacity relationship by limiting a capacity of the created volume 262 and a maintenance method B for maintaining the above capacity relationship by dynamically changing the available capacity of the local pool 263 is performed by a storage management unit 810 that manages the node group 165. For any of the maintenance methods A and B, the storage management unit 810 selects the node 200 that creates the volume. The storage management unit 810 is realized by at least one of the storage nodes 200 and a management node 300 to be described below. Specifically, for example, the storage system 160 may be the node group 165 itself, or may include elements such as at least a part of the storage management unit 810 in addition to the node group 165. One of the maintenance methods A and B may be omitted. The storage management unit 810 may be realized based on at least a part of a program shown in FIG. 10A to be described below, a program shown in FIG. 10B to be described below, and a program neither shown in FIG. 10A nor 10B.

Hereinafter, the present embodiment will be described in detail.

FIG. 1 shows a configuration of a computer system according to the present embodiment.

The computer system includes the storage system 160. The computer system may further include the management node 300 that manages the storage system 160. The storage system 160, the management node 300, and hosts 100 are connected to a network 400.

The hosts 100 are each an example of the host system 820 and are each a computer that executes the application program. The hosts 100 may be each a physical computer, a virtual machine, a container, or the like. Although not shown, the hosts 100 include each an interface device (I/F) connected to the storage system 160, a CPU, a memory, and the like, and execute each an application. The memory records a program of the application. The CPU executes the program of the application. The I/F mediates communication with the storage nodes 200.

The storage system 160 includes the node group 165. The node group 165 includes the plurality of storage nodes 200. The storage nodes 200 are each a typically general-purpose computer. The storage nodes 200 may be each a physical computer, a virtual machine, or a container, which is similar to the hosts 100, and may be each a software-defined storage node constructed by installing software in a virtual machine or the like that operates on a cloud.

FIG. 1 describes the hosts 100 and the storage nodes 200 as separate computers. However, storage software and application software may operate on the same physical computer.

The management node 300 executes software that manages the storage system 160.

The management node 300 and the storage node 200 are described as different nodes in the example of FIG. 1. However, one node may serve as both the storage node 200 and the management node 300. That is, one node may execute processing of storing data to be described below and additionally execute management software that manages the storage system and the storage nodes.

FIG. 2A shows a configuration of the storage node 200.

The storage node 200 includes a communication port 250, a CPU 230, a memory 220, and storage devices 210. At least one of these resources may be mounted on one or more storage nodes 200. One or more storage devices 210 constitute a storage device unit 249.

The communication port 250, which is an example of the interface unit, is connected to the hosts 100 and the management node 300 via the network 400, and mediates communication with the hosts 100 and the management node 300. In the shown example, one communication port 250 is shared by communication with the hosts 100 and communication with the management node 300. Alternatively, different communication ports may be provided for the communication with the hosts 100 and the communication with the management node 300.

The memory 220 is an example of the memory unit and stores control information used in the storage nodes, programs executed by the storage nodes, and a cache of data to be accessed by the hosts. Other data may be stored in the memory 220. The memory 220 is generally configured with a Dynamic Random Access Memory (DRAM), but may be configured with other storage media. For example, a Magnetoresistive Random Access Memory (MRAM), a Resistive Random Access Memory (ReRAM), a Phase-Change Memory (PCM), or a NAND flash memory may be used.

The CPU 230 is an example of the processor unit and executes various types of processing by executing the various types of programs stored in the memory 220. The CPU 230 executes the various types of processing using the various types of information stored in the memory 220.

The storage devices 210 physically include each a storage area. For example, the storage devices 210 may be each a Hard Disk Drive (HDD), a Solid State Drive (SSD), a Digital Versatile Disc (DVD), or a Storage Class Memory (SCM). Examples of I/F that accesses the storage devices 210 include a Serial Attached SCSI (SAS) and a Non-Volatile Memory Express (NVMe). However, other I/Fs may be used. A plurality of storage devices 210 may be the same type of storage devices or different types of storage devices. In general, in the storage system having the multi-node configuration, data can be protected by, for example, storing a copy of the data in another node in preparation for a node failure. One or more storage devices in the node may be grouped in a unit of a parity group, and a highly reliable technique such as Redundant Arrays of Independent Disks (RAID) may be used. The CPU 230, the memory 220, the communication port 250, and the storage devices 210 are connected to each other via an internal network 240. The configuration of FIG. 2A is an example of the configuration of the storage node 200. The invention is not limited to the configuration of the drawing. Further, the invention is not limited to FIG. 2A or configurations or processing shown in other drawings.

Figure 2B:
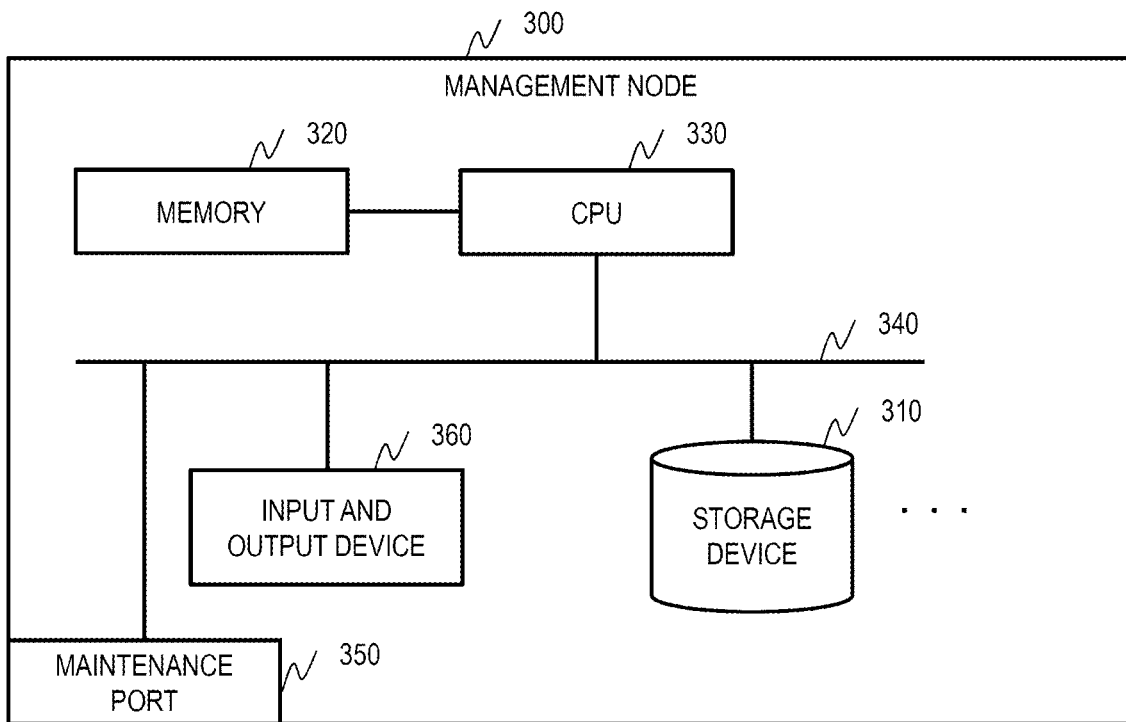
FIG. 2B shows a configuration of a management node.

FIG. 2B shows a configuration of the management node 300.

The management node 300 includes a CPU 330, a memory 320, a storage device 310, an input and output device 360, and a maintenance port 350. The CPU 330, the memory 320, the storage device 310, the input and output device 360, and the maintenance port 350 are connected to each other via an internal network 340.

The memory 320 and the storage device 310 are examples of the storage unit. At least the memory 320 of the memory 320 and the storage device 310 stores the management software (software for management). The CPU 330 executes the management software to execute management processing. The management software may include, for example, programs 233 to 237 shown in FIG. 10B. The input and output device 360 includes, for example, a mouse, a keyboard, a display, receives various types of instruction inputs from an operator who performs management, and causes various types of information to be displayed on a display. The maintenance port 350 mediates communication with the storage nodes 200.

Figure 3:
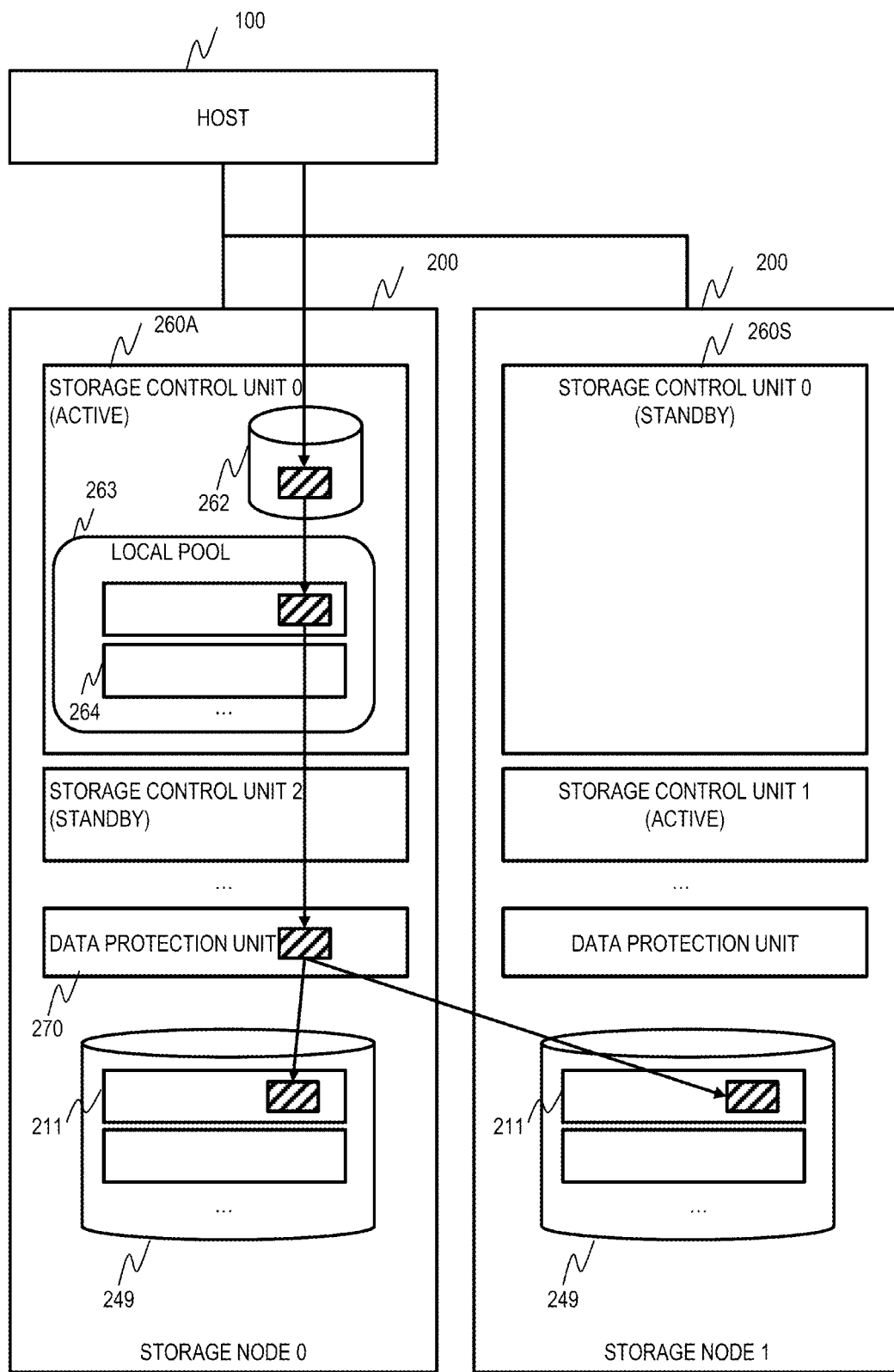
FIG. 3 shows data protection and capacity allocation.

FIG. 3 shows data protection and capacity allocation in the storage node 200.

The plurality of storage nodes 200 include one or more control unit clusters. The control unit clusters include each a storage control unit in an active state (hereinafter, referred to as an active control unit) 260A and one or more storage control units each in a standby state (hereinafter, referred to as standby control units) 260S. The active control unit 260A provides the volume 262. When receiving an I/O request for specifying the volume 262, the active control unit 260A performs I/O to the volume 262 and specifically to the local pool 263 associated with the volume 262. When the active control unit 260A is stopped, a failover is performed by which one of the standby control units 260S becomes active to replace the active control unit 260A.

The plurality of storage nodes 200 include each a data protection unit 270 that protects data (in the present embodiment, copying data and storing the copied data in another storage node 200 in addition to storing data in the own storage node 200).

First, the data protection will be described.

The storage system having the multi-node configuration assumes a node failure and protects data among the storage nodes 200. As a data protection method, for example, a method for storing the copied data in another storage node 200, and a method for generating data and parity of another node can be considered. In the example of FIG. 3, each storage node 200 stores the copied data in another node. In addition to data protection among the nodes, data may be further protected in the nodes using a method such as the RAID. When the method such as the RAID is used in the nodes, one of the storage devices 210 fails and data recovery among the nodes becomes unnecessary.

The shown example adopts a method for copying data between the storage nodes 200 by using logical chunks 264 and physical chunks 211. The term "physical chunks" refers to small areas created by dividing the storage device unit 249 in the storage node 200 into one or more pieces. The term "logical chunks" refers to logical storage areas associated with one or more physical chunks. The logical chunks are associated with the local pool 263. Write data from the hosts 100 is written in the logical chunks 264. In the shown example, mirroring is used for data protection. Therefore, two physical chunks 211 are associated with one logical chunk 264. The data protection unit 270 writes data written in the logical chunk 264 in two physical chunks 211 associated with the logical chunk 264. As a result, copying data (the data protection) is realized. In the example of FIG. 3, a certain logical chunk in a storage node 0 is created from a certain physical chunk in the storage node 0 and a certain physical chunk in a storage node 1. For the logical chunk 264 in the storage node 0, the latter between data written in the physical chunk 211 in the storage node 0 and data written in the physical chunk 211 in the storage node 1 is copied data.

Next, the local pool 263 and the volume 262 will be described.

The local pool 263 is a logical storage area including one or more logical chunks 264. The volume 262 is a logical storage area recognized by the hosts 100. Upon receiving from the hosts 100 a write request to the volume that is the storage area recognized by the hosts 100, the active control unit 260A allocates an area having a predetermined size (for example, the logical chunk 264 or an area larger or smaller than the logical chunk 264) from the local pool 263 to the volume 262, and stores data to be written in the allocated area. The data protection unit 270 writes data, which is stored in the allocated area, in the physical chunk 211 in the storage node 0 and the physical chunk 211 in the storage node 1 in accordance with correspondence between the logical chunk 264 to which the allocated area belongs and the physical chunks 211 associated with the logical chunk 264. The active control unit 260A manages the local pool 263 and the volume 262. The correspondence between the logical chunk 264 and the physical chunks 211 depends on a data protection method (for example, whether to protect data with or without the parity).

The storage node 1 takes over the processing during a failure of the storage node 0, and accordingly the storage node 1 also includes information on the logical chunk 264, information on the local pool 263, and information on the volume 262. When the storage node 0 fails, a standby control unit 0 takes over processing of an active control unit 0 (the failover). A plurality of standby control units 260S may be set for one active control unit 260A. The invention is also applicable to a storage control unit as a combination of the active control unit and the standby control unit. In this case, an exclusive function, a consistency management function, and the like between the storage nodes 200 are required.

One storage node 200 may include a plurality of storage control units 260. In the example of FIG. 3, a storage control unit 0 and a storage control unit 2 are disposed in the storage node 0. For a plurality of different control unit clusters, a plurality of active control units 260A may be distributed to the plurality of storage nodes 200 to avoid concentration of resource consumption. Further, for the plurality of different control unit clusters, the plurality of standby control units 260S may be distributed to the plurality of storage nodes 200, or aggregated to a part of the storage nodes 200.

Control information (a control table) used to control the physical chunks 211, the logical chunks 264, the local pool 263, and the active or standby configuration above will be described.

FIG. 4 shows an example of a physical chunk table.

A physical chunk table 231 is an example of information on the physical chunks 211. The physical chunk table 231 includes records of the physical chunks 211. Each record stores information such as a physical chunk number 401, a storage device number 402, in-device offsetting 403, and a size 404. Hereinafter, one physical chunk 211 is taken as an example (a "target physical chunk" in the description of FIG. 4).

The physical chunk number 401 indicates a number for identification of the target physical chunk. The physical chunk 211 is a resource in the storage node 200. The physical chunk number 401 is a non-repetitive number in the storage node 200. The storage device number 402 is for identification of the storage device 210 to which the target physical chunk belongs. The in-device offsetting 403 indicates an address of the storage device corresponding to a head of the target physical chunk. Finally, the size 404 indicates a size of the target physical chunk.

In the example of FIG. 4, a physical chunk head address of a physical chunk number 0 is an address 0x0000 of a storage device number 0, and a size of the physical chunk is 100 GB.

FIG. 5 shows an example of a logical chunk table.

A logical chunk table 232 is an example of information on the logical chunks 264. The logical chunk table 232 includes records for the logical chunks 264. Each record stores information such as a logical chunk number 501, a node number (a master) 502, a physical chunk number (a master) 503, a node number (a mirror) 504, a physical chunk number (a mirror) 505, a size 506, and a storage control unit number 507. Hereinafter, one logical chunk 264 is taken as an example (a "target logical chunk" in the description of FIG. 5).

The logical chunk number 501 is for identification of the target logical chunk. The logical chunk 264 is a resource in the storage node 200. The logical chunk number 501 is a non-repetitive number in the storage node 200. When a capacity is interchanged to another node or the like, the target logical chunk can be identified in the storage system 160 by combining the logical chunk number with the storage node number.

The node number (a master) 502 is for identification of a storage node (typically, a storage node itself including the target logical chunk) including a master physical chunk 211 between two physical chunks 211 that are associated with the target logical chunk. The physical chunk number (a master) 503 is for identification of the master physical chunk 211 associated with the target logical chunk. The node number (a mirror) 504 is for identification of a storage node (typically, a storage node except the storage node including the target logical chunk) including a mirrored physical chunk 211 between the two physical chunks 211 associated with the target logical chunk. The physical chunk number (a mirror) 505 is for identification of the mirrored physical chunk 211 (the physical chunk in which data copied (mirrored) in preparation for a failure is stored) between the two physical chunks 211 associated with the target logical chunk. The two physical chunks associated with the target logical chunk can be identified by referring to the information 502 to 505.

The size 506 indicates a size of the target logical chunk. The storage control unit number 507 indicates an identification number of the storage control unit 260 (to which the target logical chunk is allocated) that uses the target logical chunk. Each record may store a local pool number in addition to the storage control unit number 507. For example, when one storage control unit 260 manages the plurality of local pools 263, the local pool number is necessary.

In the example of FIG. 5, a logical chunk 0 corresponds to a physical chunk 0 of a storage node 0 and a physical chunk 0 of a storage node 1 and is allocated to the storage control unit 0.

FIG. 5 shows an example of a logical chunk table when data is copied. When the RAID or an Erasure Coding is applied among the nodes, a plurality of physical chunks may be grouped, and a plurality of logical chunks may be created from the plurality of grouped physical chunks. In this case, information on the grouped physical chunks is stored in FIG. 5.

FIG. 6 shows an example of a local pool table.

In order to use capacities of one or more logical chunks 264 as a capacity pool, a local pool table 228 manages correspondence with the logical chunks 264, the volumes 262 to which capacities are allocated, allocation states, and the like. The local pool table 228 includes records for pages that indicate unit areas allocated to the volumes 262. Each record stores information such as a local pool number 601, a capacity 602, a used capacity 603, a logical chunk number 604, a page number 605, a page allocation state 606, and an allocation destination volume number 607. Hereinafter, one page is taken as an example (a "target page" in the description of FIG. 6).

The local pool number 601 indicates a number for identification of the local pool 263 including the target page. When the storage control unit 260 manages the plurality of local pools 263 or the like, the local pools 263 can be identified using the local pool number 601.

The capacity 602 indicates a capacity of the local pool 263 that includes the target page. The used capacity 603 indicates an already used capacity of the local pool 263 that includes the target page. The capacity 602 may be a product of a size of the logical chunk and the number of logical chunks. The used capacity 603 may be a product of the number of "completed" page allocation and a size of the page.

The logical chunk number 604 indicates a number of the logical chunk 264 (the logical chunk 264 registered in the local pool) including the target page. One or more logical chunks 264 are registered in the local pool 263. When no logical chunk 264 is registered in the local pool 263, the local pool 263 is undefined.

The "page" is an area acquired by dividing the logical chunk 264 into smaller areas and a unit for allocation of the storage areas to the volume. When the unit for the allocation is the logical chunk, the page becomes unnecessary. In this case, the page number 605 and the page allocation state 606 are not necessary, and information indicating an allocation state of the logical chunks (whether the allocation is completed) is necessary. The page number 605 indicates a number for identification of the target page. The page allocation state 606 indicates whether the target page is allocated. The allocation destination volume number 607 indicates a number of the volume 262 to which the target page is allocated. When the allocation state of the target page indicates not being allocated, nothing may be stored as the allocation destination volume number 607 for the target page ("–" in the example of FIG. 6).

The local pool table 228 exists for each storage control unit 260. Each record in the local pool table 228 may include the storage control unit number.

Although not shown, as an example of information on the volume 262, a volume table indicating which page is allocated to which address of which volume 262 may exist in the storage node 200. The active control unit 260A can refer to or update the volume table. The active control unit 260A can specify a page allocated to an address of an I/O destination of the volume 262 by referring to the volume table.

FIG. 7 shows an example of a storage control unit table.

A storage control unit table 243 manages a configuration of the storage control unit 260. The storage control unit table 243 includes records for the storage control units 260. Each record stores information such as a storage control unit number 701, an active node number 702, and a standby node number 703. Hereinafter, one storage control unit 260 is taken as an example (a "target storage control unit" in the description of FIG. 7).

The storage control unit number 701 indicates an identification number for identification of the target storage control unit. The same identification number is assigned to both the active storage control unit and the standby storage control unit. The active node number 702 indicates a number of the storage node 200 in which the active control unit serving as the target storage control unit is disposed. The standby node number 703 indicates a number of the storage node 200 in which the standby control unit serving as the target storage control unit is disposed.

In the example of FIG. 7, the storage control unit 0 in an active state is disposed in the storage node 0, and the storage control unit 0 in a standby state is disposed in the storage node 1.

Next, the global pool in the multi-node configuration will be described.

FIG. 8 shows an example of a global pool table.

A global pool table 238 manages information on the local pools 263 that belong to the global pool 280. The global pool table 238 includes records for the local pools 263. Each record stores information such as a global pool number 801, a capacity 802, a used capacity 803, a storage control unit number 804, and a local pool number 805. Hereinafter, one local pool 263 is taken as an example (a "target local pool" in the description of FIG. 8).

The global pool number 801 indicates a number for identification of a global pool including the target local pool. The capacity 802 indicates a capacity of the global pool including the target local pool. The used capacity 802 indicates an already used capacity of the global pool. The storage control unit number 804 and the local pool number 805 indicate numbers for identification of the target local pool.

In this manner, each storage node 200 manages the local pool 263 in association with the global pool 280 in order to identify the local pool 263 that belongs to the global pool 280.

FIG. 9 is a conceptual diagram for describing a problem that may occur in a comparative example.

Examples of a pattern in which the problem occurs may include cases (1) to (4). The cases (1) to (4) are merely examples, and the problem may occur in other configurations.

<Case (1)>

In this example, an internal capacity 21 of each storage node 20 is 150 TB, a capacity of each local pool is 100 TB, a capacity of a global pool is 200 TB, and an available capacity of the global pool is 200 TB. The term "internal capacity" refers to a capacity that can be provided to the local pool 23 (for example, a capacity excluding a capacity (for example, a capacity for storing mirrored data of another node, and a capacity of a spare area for rebuilding redundancy in case of a node failure) that cannot be provided to the local pool 23 from a capacity of a storage device provided in the storage node 20). Since recognizing the available capacity 200 TB, a user of the storage system (for example, the hosts 100) may issue an instruction of creating a volume of up to 200 TB. In the example, upon receiving an instruction of creating a volume 22 of 150 TB, the volume 22 of 150 TB is created in the storage node 0. Even when a write request for writing data of 150 TB to the volume 22 is received from the hosts, data cannot be all stored since the capacity of the local pool is only 100 TB. Therefore, a write error occurs in processing of such a write request.

A reason why the capacity of the local pool is lower than the internal capacity 21 will be described. The capacity of the local pool 23 is determined by the number of logical chunks that can be registered in the local pool table and the size of the logical chunks. Even when a storage device unit having a large capacity is mounted on the storage node 20, all capacities may not be registered in the local pool.

As described above, in the example, the creation of the volume having a capacity larger than the capacity of the local pool may cause a write error.

<Case (2)>

In this example, the internal capacity 21 of each storage node 20 is 150 TB, a capacity of the local pool is 100 TB, a capacity of the global pool is 200 TB, and 50 TB which is half of the capacity of the local pool 23 is used. Therefore, an available capacity of the local pool 23 is 50 TB, and an available capacity of the internal capacity 21 is 100 TB. That is, "50 TB" described in the local pool 23 and "100 TB" described in the internal capacity 21 indicate available capacities, respectively.

The capacity of the global pool 28 is 200 TB, and an available capacity of the global pool 28 is 100 TB. Upon receiving an instruction of creating a volume of 70 TB from a user who recognizes 100 TB that is the available capacity of the global pool 28, the volume 22 of 70 TB is created in the storage node 0. Even when a write request for writing data of 70 TB to the volume 22 is received from the hosts, data cannot be all stored since the available capacity of the local pool 23 is only 50 TB. Therefore, a write error occurs in processing of such a write request.

As described above, in the example, the creation of the volume having a capacity not larger than the capacity of the local pool but larger than the available capacity of the local pool may cause a write error.

<Case (3)>

In this example, the internal capacity 21 of the storage node 20 is 50 TB, a capacity of the local pool is 50 TB, a capacity of the global pool is 100 TB, and an available capacity of the global pool 28 is 100 TB. Upon receiving an instruction of creating a volume of 70 TB from a user who recognizes 100 TB that is the available capacity of the global pool 28, the volume 22 of 70 TB is created in the storage node 0. Even when a write request for writing data of 70 TB to the volume 22 is received from the hosts, data cannot be all stored since the internal capacity 21 is only 50 TB. Therefore, a write error occurs in processing of such a write request.

In the example, the creation of the volume having a capacity larger than the internal capacity 21 may cause a write error.

<Case (4)>

In this example, the internal capacity 21 of each storage node 20 is 50 TB, a capacity of the local pool is 50 TB, a capacity of the global pool is 100 TB, and 25 TB which is half of the capacity of the local pool 23 is used. Therefore, an available capacity of the local pool 23 is 25 TB, and an available capacity of the internal capacity 21 is 25 TB. The capacity of the global pool is 100 TB, and an available capacity of the global pool 28 is 50 TB. Upon receiving an instruction of creating a volume of 50 TB from a user who recognizes 50 TB that is the available capacity of the global pool 28, the volume 22 of 50 TB is created in the storage node 0. Even when a write request for writing data of 50 TB to the volume 22 is received from the hosts, data cannot be all stored since the available capacity of the internal capacity 21 is only 25 TB. Therefore, a write error occurs in processing of such a write request.

As described above, in the example, the creation of the volume having a capacity larger than the available capacity of the internal capacity 21 may cause a write error.

As described above, the capacity that each storage node 20 can provide is likely to be smaller than the capacity of the global pool 28. Therefore, when the volume 22 is created by recognizing the capacity of the global pool 28, a write error may occur.

The present embodiment can solve the problem that occurs in the pattern such as the cases (1) to (4). Hereinafter, the present embodiment will be further described.

Figure 10A:
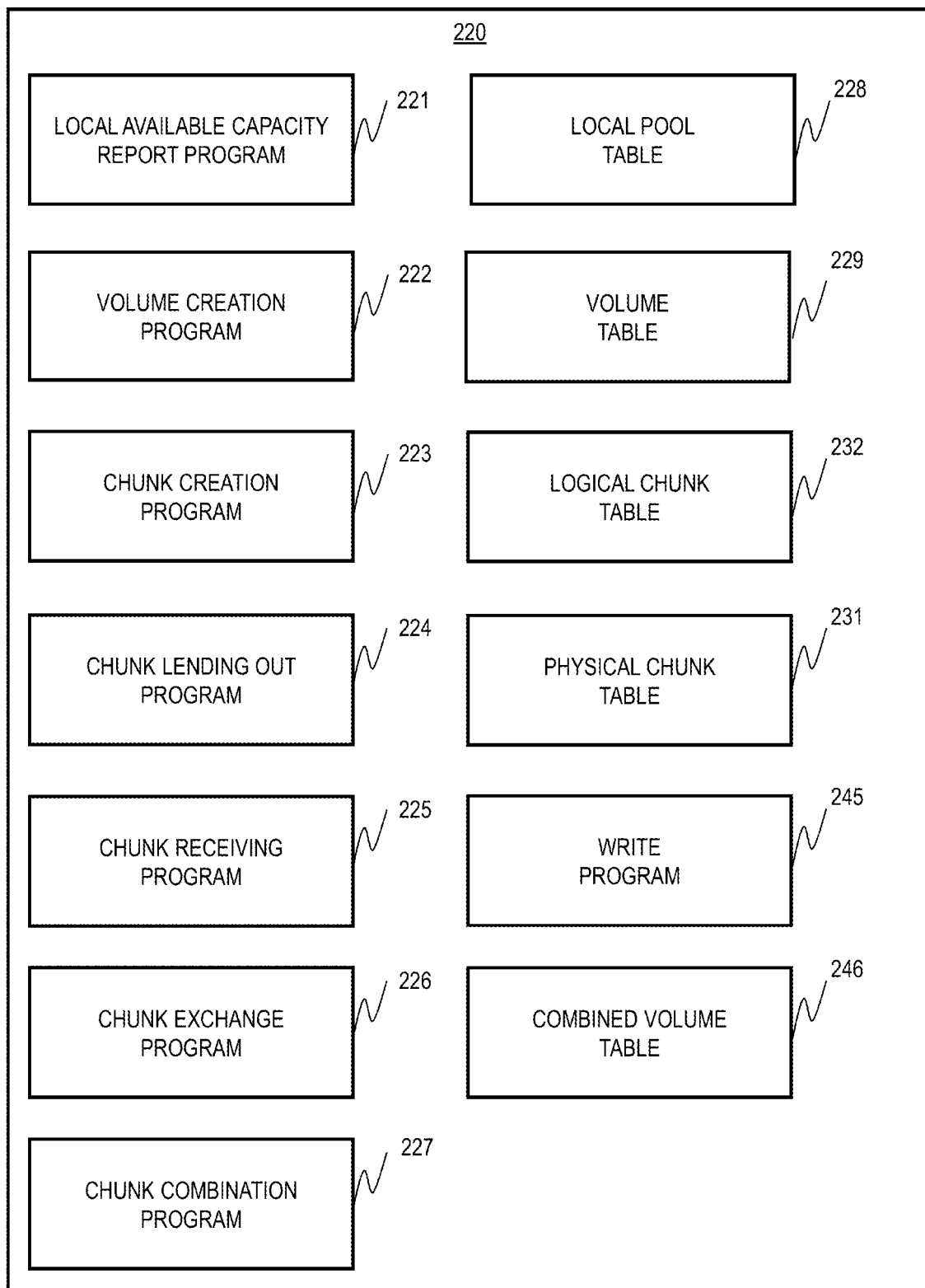
FIG. 10A shows an example of programs and tables stored in a memory of the storage node.

FIG. 10A shows programs and control information that are stored in the memory 220 of the storage node 200.

A local available capacity report program 221, a volume creation program 222, a chunk creation program 223, a chunk lending out program 224, a chunk receiving program 225, a chunk exchange program 226, a chunk combination program 227, and a write program 245 are stored in the memory 220. Processing performed by these programs will be described below.

The local pool table 228, a volume table 229, the logical chunk table 232, the physical chunk table 231, and a combined volume table 246 are stored in the memory 220. The local pool table 228 is as described with reference to FIG. 6. Although not shown in the drawings, the volume table 229 may be as described above, or may be as described below. The logical chunk table 232 is as described with reference to FIG. 5. The physical chunk table 231 is as described with reference to FIG. 4. The combined volume table 246 is as described below with reference to FIG. 22.

Figure 10B:
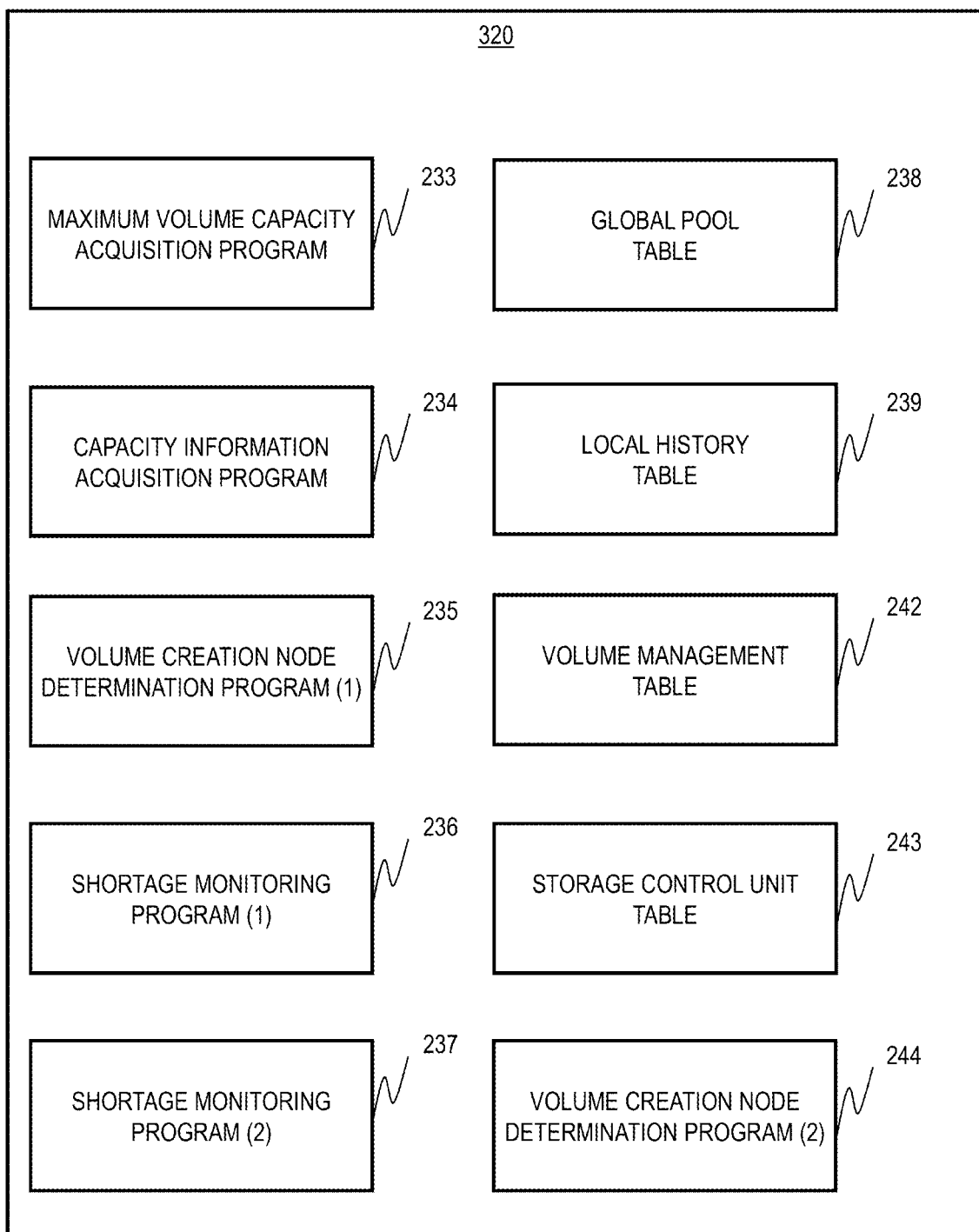
FIG. 10B shows an example of programs and tables stored in a memory of the management node.

FIG. 10B shows programs and control information that are stored in the memory 320 of the management node 300.

A maximum volume capacity acquisition program 233, a capacity information acquisition program 234, a volume creation node determination program (1) 235, a shortage monitoring program (1) 236, a shortage monitoring program (2) 237, and a volume creation node determination program (2) 244 are stored in the memory 320. Processing performed by these programs will be described below.

The global pool table 238, a local history table 239, a volume management table 242, and the storage control unit table 243 are stored in the memory 320. The global pool table 238 is as described with reference to FIG. 8. The local history table 239 and the volume management table 242 will be described below. The storage control unit table 243 is as described with reference to FIG. 7.

The programs and the tables shown in FIGS. 10A and 10B are examples. In practice, other programs and tables are also stored. The storage control unit 260 and the data protection unit 270 shown in FIG. 3 are realized based on at least one program among one or more programs shown in FIG. 10A and one or more programs not shown in FIG. 10A.

Detailed description of the volume table 229 and the volume management table 242 is omitted. The volume table 229 manages a volume number, a size, a correspondence between an in-volume address and a page, and the like. The volume management table 242 manages a volume number, a size, a number of the storage control unit in which the volume is disposed, and the like. The volume management table 242 may also manage the correspondence between the in-volume address and the page, which is similar to the volume table 229. In this case, update contents of the volume table 229 are reflected in the volume management table 242.

In the examples of FIGS. 10A and 10B, the tables and the programs are stored in the memories 220 and 230 in preparation for a power failure or the like. However, at least a part of the tables and the programs described above may be stored in the storage device unit. The tables and the programs stored in the storage device unit may be cached in a memory. The tables and the programs may be stored in both the storage device unit and the memory.

The management node 300 may store a backup of a table such as the local pool table 228, the physical chunk table 231, and the logical chunk table 232. The backup may be used for data recovery when only control information is lost, for example, during a memory failure of the storage node 200.

The tables such as the local pool table 228, the volume table 229, and the logical chunk table 232 are copied by the active control unit 260A and the standby control unit 260S. Accordingly, the standby control unit 260S which takes over the processing continues the processing via a failure or the like of the storage node 200 in which the active control unit 260A is disposed. In the following description, in updating the above-described tables, communication among nodes is performed, and the tables of both the active control unit 260A and the standby control unit 260S are updated. Since physical resources of the storage nodes 200 are managed by the physical chunk table 231, the physical chunk table 231 does not need to be copied.

In the present embodiment, a capacity relationship is maintained in which the used capacity of the volume 262 created by the storage node 200 is equal to or less than the available capacity of the local pool 263 in the storage node 200. Methods for maintaining such a capacity relationship include, as described above, the maintenance method A for maintaining the capacity relationship by limiting the capacity of the volume 262 to be created, and the maintenance method B for maintaining the capacity relationship by dynamically changing the available capacity of the local pool 263. At least one of the maintenance methods A and B can be used.

Each maintenance method will be described below.

<Maintenance Method A>

An example of an outline of the maintenance method A is as follows.

That is, the storage management unit 810 provides a maximum available capacity among a plurality of available capacities respectively possessed by the plurality of local pools 263 that constitute the global pool 280. Accordingly, a side (for example, a user) that receives the maximum available capacity can know a maximum capacity of a volume that can be created. Therefore, it is expected that the capacity of the created volume 262 is maintained equal to or less than the available capacity of the local pool 263 in the storage node 200 in which the volume 262 is created. For example, the storage management unit 810 collects the available capacities of the plurality of local pools 263 that constitute the global pool 280 respectively from the plurality of storage nodes 200, specifies the maximum available capacity among the collected plurality of available capacities, and provides the specified maximum available capacity (for example, to the hosts 100).

The storage node 200 which is a creation destination of the volume having a requested capacity after the maximum available capacity is provided may be any storage node 200 (for example, the storage node having an available capacity closest to the requested capacity) having an available capacity equal to or larger than the requested capacity. Accordingly, a write error can be avoided. For example, the storage management unit 810 may specify any available capacity equal to or larger than the requested capacity among the plurality of available capacities, and select a storage node having the above-described available capacity as a creation destination of the volume 262 having the requested capacity.

When the requested capacity is larger than the available capacity of the storage node serving as the creation destination (for example, when the available capacity is less than the requested capacity since data is written in the local pool 263 after the creation destination is selected), an error may be returned to a request for creating a volume by the storage node serving as the creation destination. Accordingly, the capacity of the created volume 262 can be maintained equal to or less than the available capacity of the local pool 263 in the storage node 200 serving as the creation destination of the volume 262. This is also effective when the volume having a capacity larger than the maximum available capacity is instructed to be created.

The maximum available capacity is provided as at least one of the maximum capacity of the volume that can be created and the available capacity of the global pool 280. Accordingly, it is possible to limit the capacity of the volume that can be requested to be equal to or less than the maximum available capacity.

Hereinafter, the maintenance method A will be described in detail.

Figure 11:
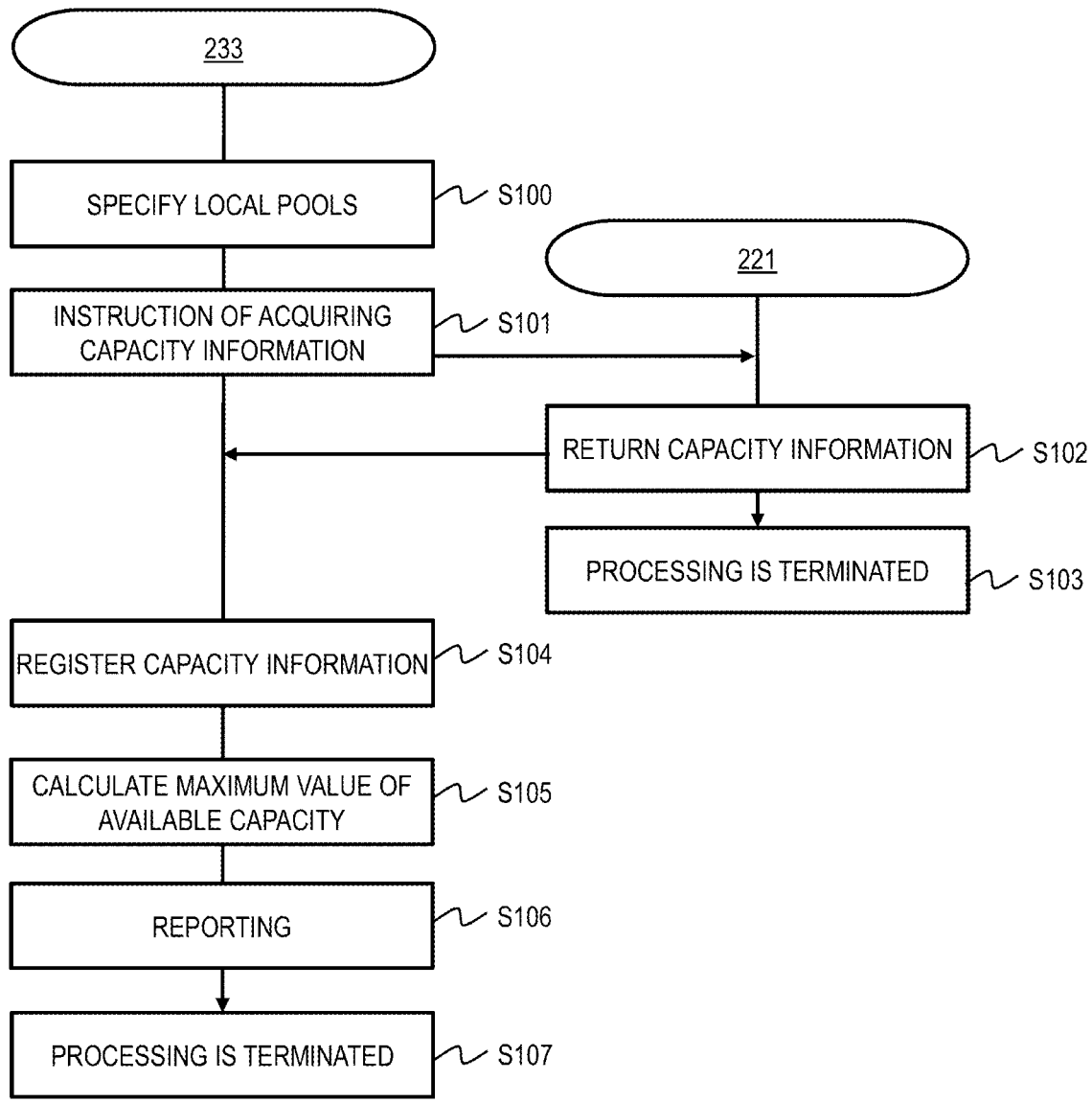
FIG. 11 shows an example of processing of a maximum volume capacity acquisition program and a local available capacity report program.

FIG. 11 shows an example of processing of the maximum volume capacity acquisition program 233 and the local available capacity report program 221.

This processing is started when an instruction of acquiring the maximum capacity of the volume (an instruction of acquiring the maximum capacity of the volume that can be created) is received from an instruction source such as a user or host management software. In the processing, the maximum capacity that can be created is calculated from a state of the storage nodes 200, and the maximum capacity is reported to the instruction source. For example, the instruction is received via a Command Line Interface (CLI), a Graphical User Interface (GUI), and a Representational State Transfer Application Programming Interface (REST API).

Upon receiving the instruction, the maximum volume capacity acquisition program 233 specifies the plurality of local pools 263 belonging to the global pool 280 by referring to the global pool table 238 (S100). In S100, the storage control unit numbers 804 and the local pool numbers 805 that are corresponding to the local pools 263 are specified.

The maximum volume capacity acquisition program 233 issues an instruction of acquiring capacity information (an instruction of acquiring information indicating an available capacity) to the plurality of storage nodes 200 in which the specified plurality of local pools 263 are respectively disposed and waits for a response (S101). The instruction of acquiring the capacity information includes, for example, numbers of the specified local pools 263 (that is, any available capacity of the local pool 263 to be acquired is instructed).

In response to the instruction, the local available capacity report program 221 of the storage node 200 that has received the instruction of acquiring the capacity information, specifies from the local pool table 228 the capacities 602 and the used capacities 603 (available capacity=capacity 602−used capacity 603) of the local pools 263 specified by the instruction, reports the capacity information indicating the specified capacities 602 and the specified used capacities 603 (or available capacities) to the instruction source (S102) and terminates the processing (S103).

The maximum volume capacity acquisition program 233 that has received the report from the local available capacity report program 221 stores the capacity information on the local pools 263 specified in S100 in the local history table 239 (S104). Next, the maximum volume capacity acquisition program 233 calculates (specifies) a maximum value among the available capacities of the plurality of local pools 263 specified in S100 (S105), reports the maximum value as the maximum capacity of the volume that can be created to the source of the instruction of acquiring the maximum capacity (S106) and terminates the processing (S107).

In the above description, the available capacity is calculated by the capacity 602−the used capacity 603. This may be calculated by a maximum local pool capacity in specification−the used capacity 603. For example, when 1000 logical chunks of 100 GB can be registered in the local pool 263, the maximum local pool capacity in the specification is 100 TB. The maximum local pool capacity in the specification can be realized by adding the storage device 210 to one of the storage nodes 200 including the local pool 263. Both calculation results may be provided to a user. A user who does not want to add the storage device 210 can create a volume with reference to the value calculated by the capacity 602−the used capacity 603. The user who does not want to add the storage device 210 can create the volume with reference to the value calculated by the maximum local pool capacity in the specification−the used capacity 603.

Figure 14:
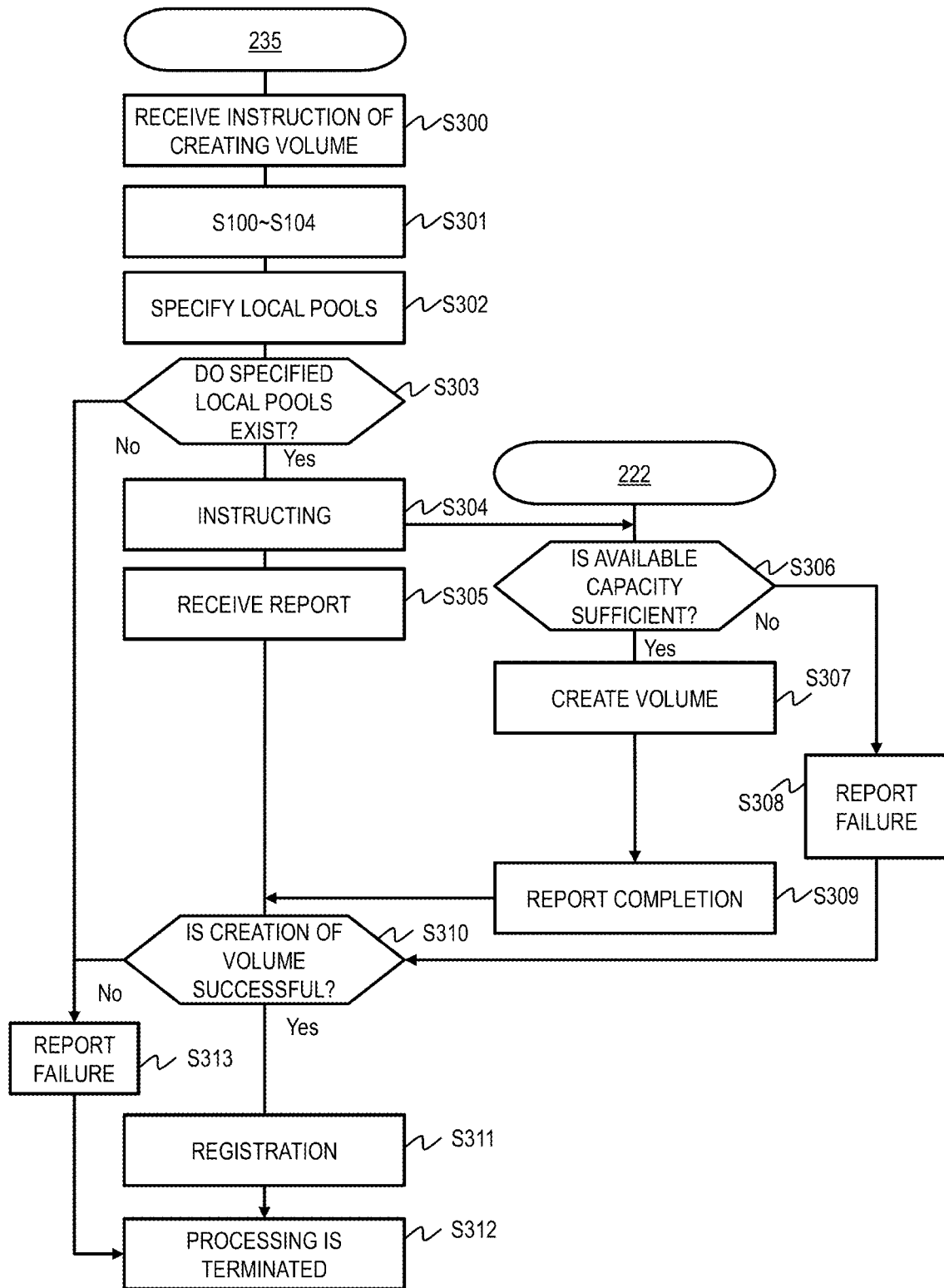
FIG. 14 shows an example of processing of a volume creation node determination program (1) and a volume creation program.

In this manner, creation of a volume having a capacity that causes a write error can be avoided by setting the maximum value among the available capacities of the nodes 200 to be the maximum capacity of the volume that can be created. In order to avoid a write error, processing shown in FIG. 14 is also performed.

The above calculation result (the reported maximum capacity) for the example of FIG. 9 is 100 TB for case (1), 50 TB for case (2), 50 TB for case (3), and 25 TB for case (4). No write error occurs in the cases.

The maximum volume capacity acquisition program 233 communicates with all the nodes 200 in which all the local pools 263 belonging to the global pool 280 are respectively disposed.

In the example of FIG. 11, the management node 300 communicates with the storage nodes 200 upon receiving the instruction of acquiring the maximum capacity. Alternatively, the maximum volume capacity acquisition program 233 may report the maximum capacity of the volume that can be created to the instruction source without communicating with the storage nodes 200 by referring to the local history table 239. Specifically, for example, steps S100 to S104 are periodically executed in advance, and the capacity information on the local pools is stored in the local history table 239. When the instruction of acquiring the maximum capacity is received, only steps S105 to S107 are executed (that is, communication with the storage nodes 200 is not necessary). In this manner, response time for acquiring the capacity information can be shortened.

In S105, the maximum volume capacity acquisition program 233 calculates the maximum available capacity by using the capacities and the used capacities acquired from the local history table 239. In the above description, the capacity information on the local pools 263 is managed as history. However, only the latest capacity information may be held.

Figures 12, 13:
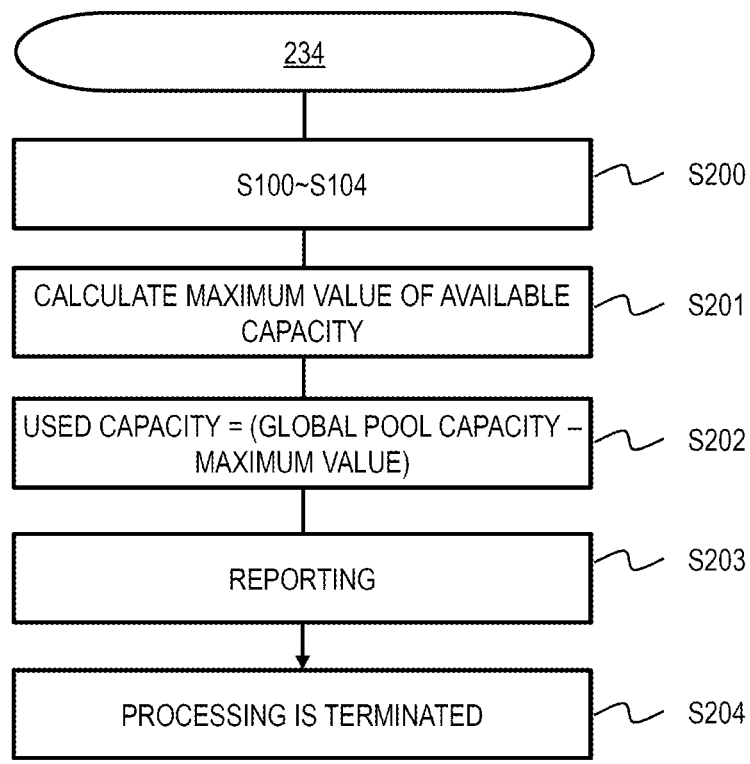
FIG. 12 shows an example of a local history table.
FIG. 13 shows an example of processing of a capacity information acquisition program.

FIG. 12 shows an example of the local history table 239.

The local history table 239 manages the capacity information on the local pools belonging to the global pool 280. The local history table 239 includes records for the local pools 263. Each record stores information such as time 1201, a storage control unit number 1202, a local pool number 1203, a capacity 1204, a used capacity 1205, the number of registered chunks 1206, a total volume capacity 1207, and an internal capacity 1208. Hereinafter, one local pool 263 is taken as an example (a "target local pool" in the description of FIG. 12).

The time 1201 indicates time at which the capacity information on the target local pool is collected.

The storage control unit number 1202 and the local pool number 1203 indicate a number of the storage control unit 260 to which the target local pool is allocated and a number of the target local pool 263, respectively. The storage control unit number 1202 and the local pool number 1203 are the same as the storage control unit number 804 and the local pool number 805 that are specified in S100.

The information 1204 to 1208 may be included in the capacity information. Specifically, the capacity 1204 corresponds to the capacity 602 of the target local pool. The used capacity 1205 corresponds to the used capacity 603 of the target local pool. The number of the registered chunks 1206 indicates the number of chunks registered in the target local pool. The total volume capacity 1207 indicates a total capacity of all the volumes 262 associated with the target local pool. The internal capacity 1208 indicates an internal capacity of a storage node including the target local pool 263. The information 1204 to 1208 is reported in step S102, and is stored in the local history table 239 in step S104. When the maintenance method A is used, the time 1201, the storage control unit number 1202, the local pool number 1203, the capacity 1204, and the used capacity 1205 are used. When the maintenance method B is used, the other information 1206 to 1208 is used. If there is the internal capacity 1208, even when a capacity larger than the capacity or the available capacity of the local pool is reported as the capacity of the volume that can be created, it is expected that chances of a write error can be reduced by performing control so that the internal capacity is not exhausted (for example, by taking measures such as adding the storage device before the available capacity of the internal capacity reaches zero).

In FIG. 11, the maximum capacity of the volume that can be created by the user or the host management software is acquired. However, as an interface with the host management software, there may be no interface for acquiring the maximum capacity of the volume that can be created. In such a case, the maximum capacity may be returned as the available capacity of the global pool 280.

FIG. 13 shows an example of processing of the capacity information acquisition program 234. The capacity information acquisition program 234 acquires capacity information on the global pool 280.

Upon receiving an instruction of acquiring the capacity information on the global pool 280, the capacity information acquisition program 234 executes processing that is the same as that of steps S100 to S104, so as to acquire information on the local pools belonging to the global pool 280 from the storage nodes 200 (S200). Communication with the storage nodes 200 may be avoided by referring to the local history table 239, which is similar to the maximum volume capacity acquisition program 233.

Next, the capacity information acquisition program 234 calculates the maximum value among the available capacities of the plurality of local pools belonging to the global pool 280 (S201), and updates the used capacity 803 (see FIG. 8) of the global pool 280 to a value obtained by subtracting the maximum value (the calculation result of S201) from the capacity 802 (S202).

Finally, the capacity information acquisition program 234 reports capacity information including the capacity, the available capacity, and the used capacity of the global pool 280 to the instruction source (S203) and terminates the processing (S204).

In this manner, the maximum capacity of the volume that can be created as reported in FIG. 11 can be reported as the available capacity of the global pool. Accordingly, the creation of the volume having the capacity that causes a write error can be prevented.

FIGS. 11 and 13 describe processing of avoiding the creation of the volume having the capacity that causes a write error. Even when a volume having a capacity smaller than the capacity of the volume reported in FIG. 11 and the available capacity reported in FIG. 13 is created, a write error may occur when the storage node having a small available capacity is the creation destination of the volume.

FIG. 14 shows an example of processing of the volume creation node determination program (1) 235 and the volume creation program 222. The volume creation node determination program (1) 235 determines a storage control unit (the storage node 200) as the creation destination of the volume based on the capacity of the volume that can be created so as to cause no write error. The volume creation program 222 creates the specified volume.

The volume creation node determination program (1) 235 receives a request for creating the volume from, for example, a user via the GUI, the CLI, or the API (S300) and executes processing that is the same as that of steps S100 to S104 (S301). Step S301 may be avoided by referring to the local history table 239.

Next, the volume creation node determination program (1) 235 lists up the local pools 263 having available capacities equal to or larger than a specified capacity of the volume (S302) and determines whether the corresponding local pools 263 exist (S303). When no corresponding local pools 263 exists (S303: No), the volume creation node determination program (1) 235 reports to a transmission source (for example, a requester) of the request for creating a volume that a capacity larger than the capacity which can be created is specified (S313) and terminates the processing (S312). In the example of the program, an error is reported when the capacity larger than the capacity that can be created is specified. However, the volume may be created. In the processing of FIGS. 11 and 12, the maximum capacity of the volume that can be created has been reported to a user. Therefore, when an instruction of creating a volume having the capacity larger than the maximum capacity of the volume which can be created is issued, it can be considered that the writing is permitted. This is because there is also a user who adds the storage device 210 to the storage node 200.

On the other hand, when the corresponding local pools 263 exist (S303: Yes), the volume creation node determination program (1) 235 selects one local pool from one or more listed-up local pools 263 and issues the instruction of creating the volume to the storage node 200 including the selected local pool (S304). Since any listed-up local pool 263 has the available capacity equal to or larger than the specified capacity of the volume, any local pool 263 may be selected. For example, the local pool 263 having the maximum available capacity may be selected, or the local pool 263 may be selected by a selection algorithm such as round robin. In the instruction of creating the volume, for example, a number of the selected local pool 263 is specified.

The volume creation program 222 of the storage node 200 that has received the instruction of creating the volume determines whether the specified capacity of the volume is equal to or less than the available capacity (the capacity 602 of the local pool 263 specified by the instruction of creating the volume and the available capacity specified by the used capacity 603) (S306). That is, even when the local pool 263 which has the available capacity equal to or larger than the specified capacity of the volume is listed up, the volume creation program 222 of the node 200 including the local pool 263 determines whether there is the available capacity equal to or larger than the specified capacity of the volume in the local pool 263 when the instruction of creating the volume is received. This is because, after the local pool 263 is listed up and before the node 200 including the local pool 263 receives the instruction of creating the volume, the used capacity of the local pool 263 increases, and as a result, the available capacity of the local pool 263 may be less than the specified capacity of the volume. When the specified capacity of the volume is equal to or less than the available capacity (S306: Yes), the volume creation program 222 updates the volume table 229 to create the volume (S307) and reports completion thereof (returns a response of completion) (S309).

When the specified capacity of the volume is larger than the available capacity (S306: No), the volume creation program 222 reports that the capacity larger than the capacity which can be created is specified (returns a response of failure) (S308).

The volume creation node determination program (1) 235 that has received the response from the volume creation program 222 determines whether the creation of the volume has succeeded (S310).

When the creation of the volume fails (S310: No), the volume creation node determination program (1) 235 reports to the transmission source of the request for creating the volume that the capacity larger than the capacity which can be created is specified (S313) and terminates the processing (S312). When there are other local pools having the available capacity equal to or larger than the specified capacity of the volume, the processing returns to step S304, and the instruction of creating the volume may be issued to the storage nodes 200 including other local pools.

On the other hand, when the creation of the volume is successful (S310: Yes), the volume creation node determination program (1) 235 registers information on the created volume in the volume management table 242 (S311) and terminates the processing (S312).

It is possible to avoid, by the processing described in FIG. 11 or FIG. 13 and the processing described in FIG. 14, a write error caused by the creation of the volume having the capacity larger than the capacity that can be provided by the storage node 200.

A write error can be avoided simply by the processing of FIG. 14 without performing the processing of FIG. 11 or FIG. 13.

<Maintenance Method B>

The storage management unit 810 adds chunks to a corresponding storage node 200. Chunk addition is to add one or more logical chunks 264 to the local pool 263 of the corresponding storage node 200. Accordingly, an available capacity of the local pool 263 is increased, and thus a capacity of the volume created in the storage node 200 can be maintained to be equal to or less than the available capacity of the local pool 263. In each storage node 200, there is an upper limit to the number of logical chunks 264 that constitute the local pool 263 of the storage node 200. Specifically, for example, in the local pool table 228, there is an upper limit to the number of records for one local pool 263. Therefore, enlargement of the local pool table 228 can be prevented.

First chunk addition may be used as the chunk addition. In the first chunk addition, one or more logical chunks 264 to be added have a relatively large size (for example, the logical chunks 264 having a size larger than a normal size). Accordingly, the local pool 263 can be set to a large capacity with a limited number of logical chunks, so that the capacity relationship can be maintained.

Second chunk addition may be used as the chunk addition. In the second chunk addition, at least one added logical chunks is interchanged from at least one storage node 200 except the corresponding storage node 200. Accordingly, even when there is a shortage of the logical chunks or an internal capacity in the storage node 200, the capacity relationship can be maintained for the storage node 200. It is preferable that the interchanged logical chunk has a relatively large size. This is because the local pool 263 can be set to a large capacity with the limited number of logical chunks. However, when the internal capacity or the available capacity in the storage node 200 on a side provided with the logical chunks 264 is so small that a condition indicating a capacity shortage is satisfied, the interchanged logical chunks may have a normal size. When there is a shortage of the internal capacity or the like, the capacity relationship can be maintained for the storage node 200 by interchanging the physical chunks.

In any of the above-described chunk addition, one or more logical chunks 264 to be added may be the logical chunks 264 that have already been created before the chunk addition. In this case, it is expected that the chunk addition is rapidly completed.

Instead or in addition to the chunk addition, volume migration may be performed to maintain the capacity relationship. Specifically, at least one volume 262 associated with the local pool 263 of the storage node 200 is migrated to the local pool 263 having an available capacity larger than the available capacity of the local pool 263. Accordingly, the available capacity of the local pool 263 of the storage node 200 is increased, so that the capacity relationship can be maintained. The volume migration is performed by, for example, the storage management unit 810. The local pool 263 of a migration source and the local pool 263 of a migration destination may be located in the same storage node 200 or in a plurality of different storage nodes 200.

Instead or in addition to at least one of the chunk addition and the volume migration, a combination of chunks is performed to maintain the capacity relationship. Instead of combining two or more logical chunks 264 that are a part of the local pool 263 of the storage node 200, the combination of chunks refers to setting a logical chunk 264 (that is, one logical chunk 264 in which the two or more logical chunks are combined), which has a size larger than that of each of the two or more logical chunks 264 and stores data located in the two or more logical chunks 264, as a component of the local pool 263. Accordingly, the local pool 263 can be set to the large capacity with the limited number of logical chunks (when the logical chunks that are available as the data is migrated are released from the local pool 263, the number of registrable chunks (a difference (a remaining number) between an upper limit to the number of logical chunks and the number of registered logical chunks) increases), and thus the capacity relationship can be maintained. The combination of chunks is performed by, for example, the storage management unit 810.

At least one of the chunk addition, the volume migration, and the combination of chunks is performed when a shortage condition of the storage node 200 is satisfied. Under the shortage condition, the number of logical chunks that constitute the local pool 263 is close to the upper limit (the upper limit to the number of logical chunks) for the storage node 200, in other words, the condition is defined as a shortage of registrable chunks of the local pool 263. When the shortage condition is satisfied, the capacity relationship can be maintained with the limited number of logical chunks by performing at least one of the chunk addition (especially addition of logical chunks 264 having a large size), the volume migration, and the combination of chunks. It is preferable that the chunks added in the chunk addition performed when the shortage condition is satisfied are logical chunks 264 having a relatively large size, but logical chunks 264 that constitute the local pool 263 when the shortage condition is not satisfied preferably have a normal size (a relatively small size). This is to avoid a fact that the I/O is concentrated on two certain physical chunks 211 corresponding to a certain logical chunk 264, or that a size of an unused area for a certain logical chunk 264 remains large.

At least one of the second chunk addition and the volume migration is not limited to a case where the shortage condition is satisfied, and may be performed when a condition is satisfied in which there is a shortage of an available capacity of the internal capacity (a base capacity of the local pool 263) in the storage node 200. When the second chunk addition is performed in such a case, chances of generating a write error can be reduced even when data is written to the added logical chunks 264 since the available capacity of the internal capacity is not consumed. When the volume migration is performed in such a case, chances of generating a write error can be reduced since the available capacity of the internal capacity is increased.

Instead or in addition to at least one of the chunk addition, the volume migration, and the combination of chunks, chunk exchange is performed to maintain the capacity relationship. The chunk exchange is to exchange one or more logical chunks 264 which are a part of the local pool 263 of the storage node 200 with one or more logical chunks 264 whose sizes are respectively larger than those of the one or more logical chunks 264 and which are included in any storage node 200 except the above-described storage node 200. Accordingly, even when the number of logical chunks related to the local pool 263 of the storage node 200 reaches the upper limit to the logical chunks, the available capacity of the local pool 263 can be increased, so that the capacity relationship can be maintained. The chunk exchange is performed by, for example, the storage management unit 810.

Hereinafter, the maintenance method B will be described in detail.

Figure 15:
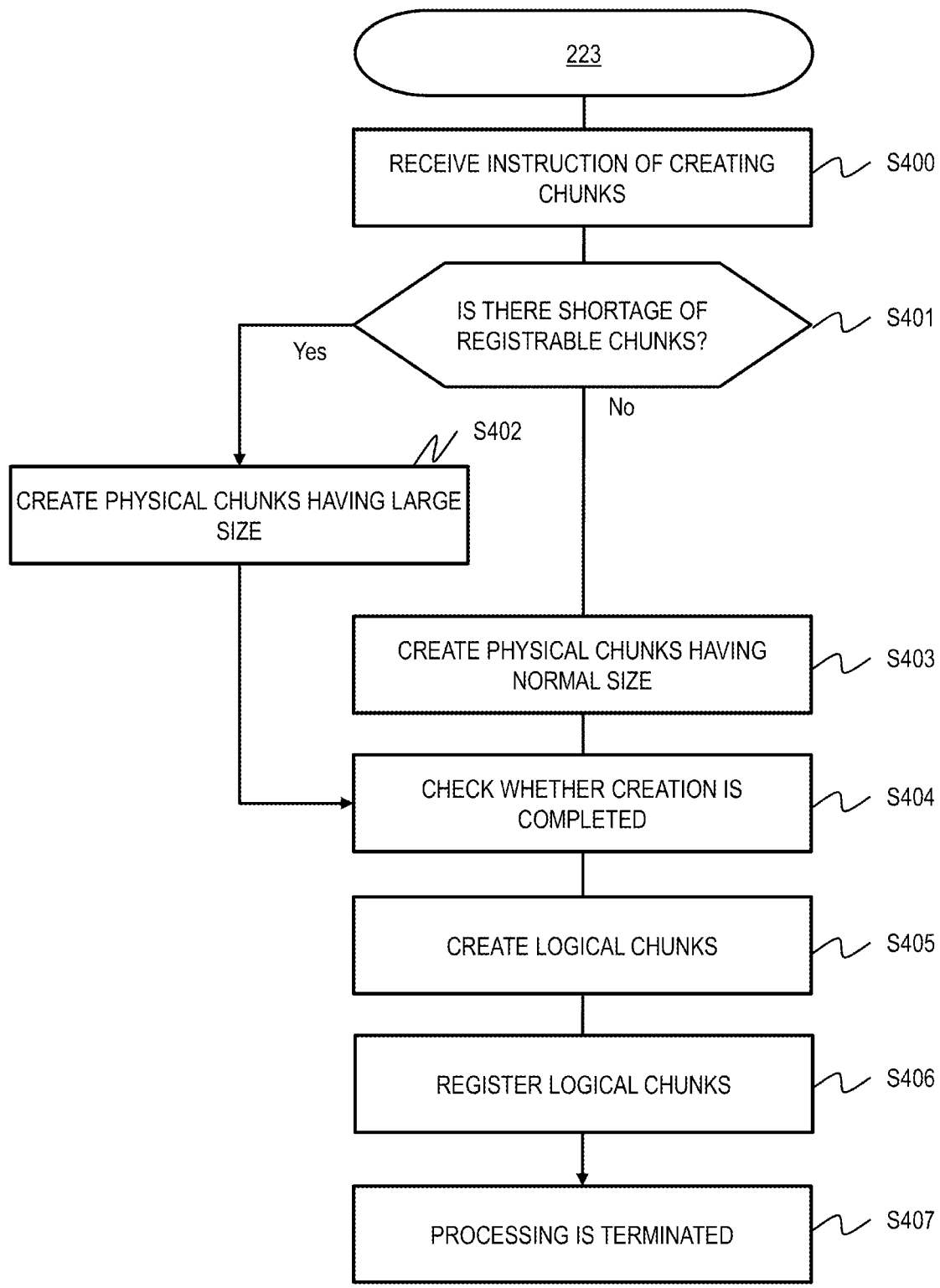
FIG. 15 shows an example of processing of a chunk creation program.

FIG. 15 shows an example of processing of the chunk creation program 223. When the number of logical chunks registrable in the local pool 263 reaches the upper limit during chunk creation, the program 223 creates chunks having a large size, thereby increasing a capacity of the local pool within the upper limit of the number of logical chunks.

The chunk creation program 223 receives an instruction of creating a chunk (S400) and checks whether there is a "shortage" related to the number of chunks registrable in the local pool (S401).

In S400, the management node 300 may transmit the instruction of creating a chunk. Although not shown, a program that adds a storage device to the storage node 200 may transmit the instruction of creating a chunk. A program that adds the storage device 210 to the storage node 200 and detects an area where no chunk is created for the added storage device 210 may also transmit the instruction of creating a chunk. In order to create the logical chunk 264, a node number (a master) and a node number (a mirror) are passed as parameters from an instruction source.

In S401, the "shortage" may be defined as the number of chunks registrable in the local pool 263 being equal to or less than a predetermined number, or a ratio of the number of registrable chunks to the upper limit to the number of logical chunks being equal to or less than a predetermined ratio. The "shortage" may be defined as the available capacity of the local pool 263 being equal to or less than a predetermined value. The "shortage" may be defined as a total capacity of a created volume for the local pool 263 being constant but there being a shortage of a capacity in the logical chunk having a normal size. For example, when a size of the logical chunk is 1 GB and 1000 logical chunks 264 can be registered, 1000 GB (=1 GB×1000) is the capacity of the local pool 263. When one or more volumes of 1500 GB in total are created for the local pool 263, it can be determined that there is a shortage. The "shortage" may be defined by other definitions other than those described above.

When there is a "shortage" (S401: Yes), the chunk creation program 223 creates physical chunks having a size larger than a normal size from master nodes (storage nodes of node numbers (masters) specified as parameters) and mirrored nodes (storage nodes of node numbers (mirrors) specified as parameters) (S402). As a result, the master physical chunks and the mirrored physical chunks are created.

On the other hand, when there is no "shortage" (S401: No), the chunk creation program 223 creates physical chunks having a normal size from the master nodes and the mirrored nodes (S403).

Information on the master physical chunks and the mirrored physical chunks that are created in step S402 or S403 is registered in records corresponding to logical chunks to be created (new records in the logical chunk table 232).

The normal size may be fixed; however, the size larger than the normal size may or may not be fixed. In the latter case, for example, a required size of a chunk may be calculated and the calculated size of a chunk may be large. Specifically, for example, a situation may be considered where 900 chunks each having a capacity of 1 GB are created, the number of remaining chunks that can be created is 100, and a created capacity of a volume is 1500 GB. In that case, since it is necessary to create a capacity of at least 600 GB with the remaining 100 chunks, a size of a chunk is 6 GB. An interface that receives the size of the chunk from a user or a host system may be provided by the storage management unit 810 (for example, the node 200 or the node 300). Both the normal size and the large size of the chunk may be received via the interface, or only the large size may be received. Receiving the size of the chunk is not limited to the creation of chunks shown in FIG. 15, and may be applied to other processing.

Subsequent to S402 or S403, the chunk creation program 223 checks whether physical chunks of pair partner nodes are created (S404). A pair partner refers to a storage node identified by a node number (a mirror) when a storage node is identified by a node number (a master).

After creating and checking the physical chunks, the chunk creation program 223 creates logical chunks 264 associated with the master physical chunks and the mirrored physical chunks (S405). In the creation of the logical chunks 264, new records corresponding to the logical chunks 264 are registered in the logical chunk table 232.

Finally, the chunk creation program 223 registers information on the created logical chunks 264 in the local pool table 228 (S406) and terminates the processing (S407). The registration of the logical chunks in the local pool table 228 includes addition of the logical chunk number 604, the page number 605, the page allocation state 606, and the allocation destination volume number 607 to the local pool table 228, and an update of the capacity 602.

At least one of the following may be used for the processing shown in FIG. 15:
  the creation of the physical chunks 211 and the creation of the logical chunks 264 are performed at separate timings;
  the creation of the logical chunks 264 and the registration of the logical chunks 264 in the local pool 263 are performed at separate timings. For example, the logical chunks 264 may be registered in the local pool 263 when the available capacity of the local pool 263 approaches a shortage. In this manner, when the logical chunks or the physical chunks are interchanged to other storage nodes 200, it is not necessary to move stored data to other logical chunks or physical chunks. Speed of the interchange can be improved.

As described above, by taking FIG. 9 as an example, a local pool 263 having a capacity of 100 TB or more can be created for the case (1) or the case (2), and a write error can be avoided.

According to the example of FIG. 15, the physical chunks having a large size are created and the logical chunks associated with the created physical chunks that have the large size are created. As a result, the created logical chunks have a large size. It should be noted that as a method for creating the logical chunks having a large size, another method, for example, a method for creating a logical chunk that has a large size and is associated with a plurality of physical chunks having a normal size may also be used. Specifically, one or more node numbers (masters), a plurality of physical chunk numbers (masters), one or more node numbers (mirrors), and physical chunk numbers (mirrors) having the same quantity as that of the physical chunk numbers (masters) are associated with one logical chunk number of the logical chunk table 232 shown in FIG. 5. For example, a physical chunk 0 and a physical chunk 1 of a node 0 that serve as master physical chunks are associated with a logical chunk 0. Accordingly, a logical chunk having a size of 200 GB (an example of a logical chunk having a size larger than a normal size) can be created without correcting the logical chunk. When the other method is used, physical chunks having a normal size are created in step S402 of FIG. 15, and information on a plurality of physical chunks associated with one logical chunk number may be stored in the logical chunk table 232 in step S405.

Figure 16:
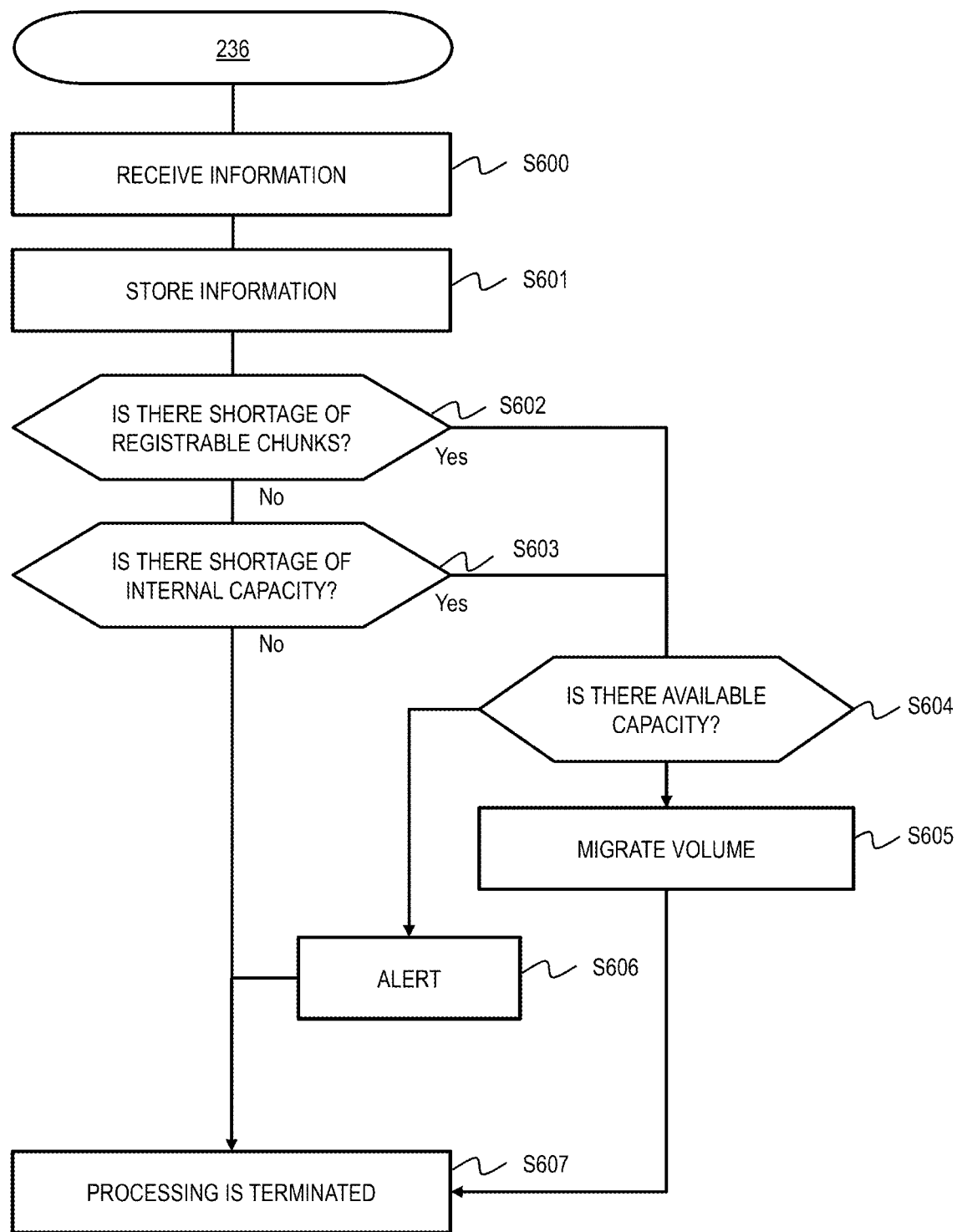
FIG. 16 shows an example of processing of a shortage monitoring program (1)

FIG. 16 shows an example of processing of the shortage monitoring program (1) 236. The program 236 monitors the number of chunks registrable in each local pool 263, and when there is a shortage of the registrable chunks, migrates a volume to another node 200 to solve a problem of the shortage of the chunks.

The shortage monitoring program (1) 236 collects information such as the capacity of the local pool 263 of the node 200, the used capacity, the number of registered chunks, the total volume capacity, and the internal capacity (S600) and stores the collected information in the local history table 239 (S601).

Next, the shortage monitoring program (1) 236 checks whether there is the local pool 263 that is in a shortage of the registrable chunks (for example, the local pool 263 whose ratio of the number of registered chunks to an upper limit to the number of registrable logical chunks is larger than a predetermined value) (S602). When there is no local pool 263 that is in a shortage of the registrable chunks (S602: No), the shortage monitoring program (1) 236 checks whether there is the local pool 263 that is in a shortage of the internal capacity (for example, the local pool 263 whose ratio of the available capacity to the internal capacity is less than a predetermined value) (S603). When there is no local pool 263 that is in a shortage of the internal capacity (S603: No), the shortage monitoring program (1) 236 terminates the processing (S607).

On the other hand, in a case of S602: Yes or S603: Yes, the shortage monitoring program (1) 236 checks whether there is the local pool 263 having the available capacity (for example, the local pool 263 having a ratio of the used capacity to the capacity is less than a predetermined value) (S604). Even when the capacity moved from the local pool 263 specified in step S602 or S603 is added, the local pool 263 having the available capacity is detected. In this manner, a frequent volume migration can be avoided.

When there is the local pool 263 having the available capacity (S604: Yes), the shortage monitoring program (1) 236 transmits an instruction of volume migration, that is, performing volume migration from the local pool 236 serving as a migration source (the local pool 263 that is in a shortage of the registrable chunks or the internal capacity) to the local pool 236 serving as a migration destination (the local pool 263 having the available capacity) (S605). A transmission destination of the instruction may be one or more storage nodes 200 having at least one of the local pool 236 serving as the migration source and the local pool 236 serving as the migration destination. In response to the instruction, the volume is migrated from the local pool 236 serving as the migration source to the local pool 236 serving as the migration destination. A number of the volume to be migrated may be specified as a parameter of the instruction. The volume to be migrated may be determined according to a degree of the shortage of the local pool 236 serving as the migration source.

On the other hand, when there is no local pool having the available capacity (S604: No), the shortage monitoring program (1) 236 reports an alert to, for example, an administrator or a user (S606). The alert may be a notification of capacity exhaustion, or may be for prompting a user to add a storage device or delete a volume.

Finally, the shortage monitoring program (1) 236 terminates the processing (S607).

In the volume migration, data in the volume is migrated from the migration source to the migration destination. As a function for the volume migration, a function such as Non-Disruptive Volume Migration is known, and such a function can be used.

As described above, by taking FIG. 9 as an example, the available capacity can be created in the storage node 0 by moving a used capacity of the storage node 0 to the storage node 1 for the case (2) or the case (4).

Figure 17:
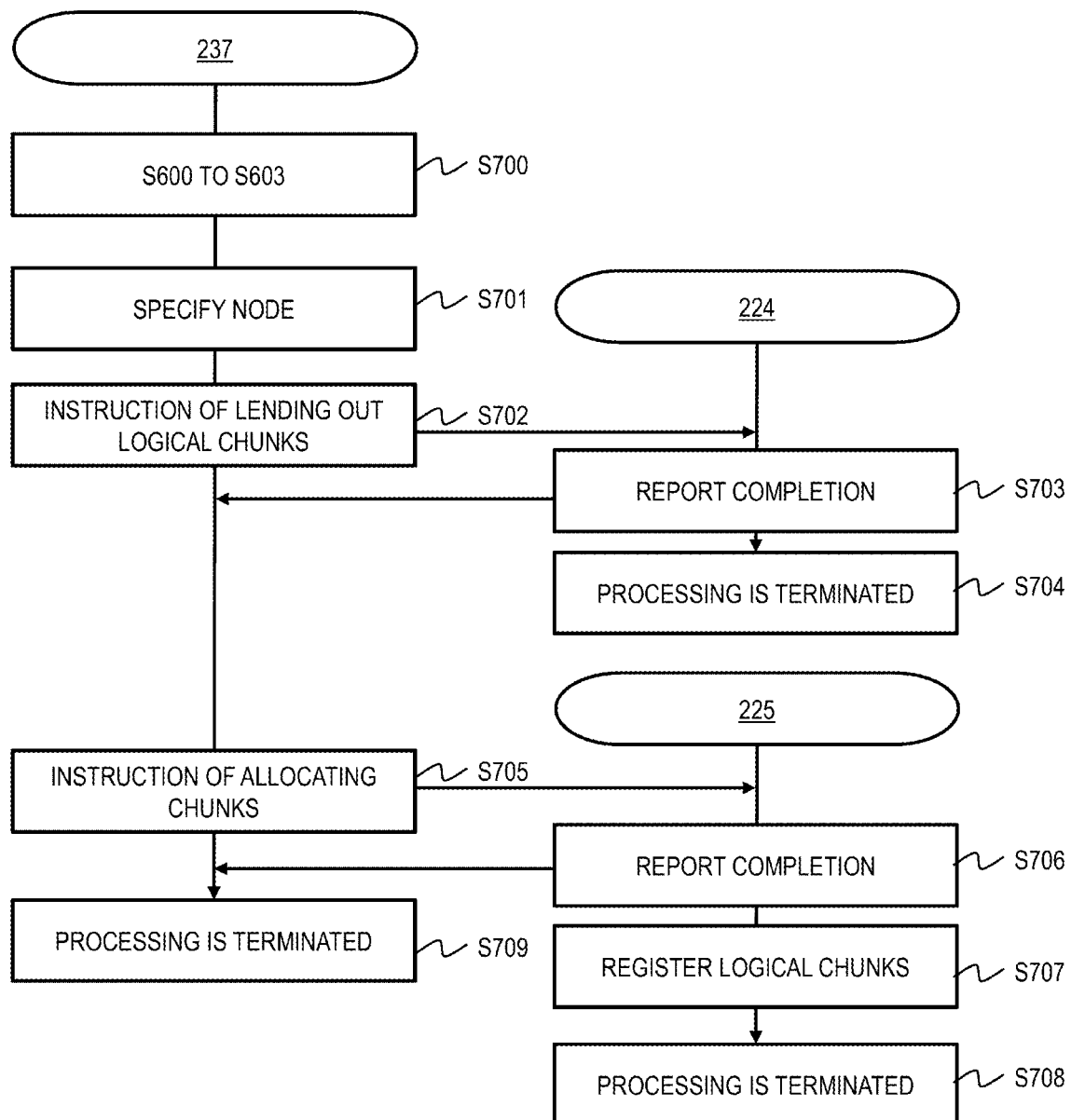
FIG. 17 shows an example of processing of a shortage monitoring program (2), a chunk lending out program, and a chunk receiving program.

FIG. 17 shows an example of processing of the shortage monitoring program (2) 237, the chunk lending out program 224, and the chunk receiving program 225. These programs monitor the number of registrable chunks of the local pool 263. When there is a shortage of the registrable chunks, a problem of a shortage of a capacity is solved by performing interchange with logical chunks having a large size (or a normal size) in other nodes.

The shortage monitoring program (2) 237 executes the same processing as that in steps S600 to S603 of FIG. 16 (S700). When one of the results of steps S602 and S603 is Yes, steps S701 to S709 are executed.

The shortage monitoring program (2) 237 specifies the node 200 where the logical chunks have a large size (S701) and transmits to the node 200 an instruction of lending out the logical chunks having the large size (S702).

The chunk lending out program 224 of the storage node 200 that receives the instruction of lending out the logical chunks lends out the logical chunks and reports completion thereof (S703). Finally, the chunk lending out program 224 terminates the processing (S704). In lending out the logical chunks, a fact that the logical chunks are lent out is recorded in the logical chunk table 232. Specifically, for example, a number of a storage node serving as a lend-out destination is stored in a record corresponding to the lent out logical chunks in the logical chunk table 232. In step S703, information stored in the logical chunk table 232 regarding the lent out logical chunks is passed to the management node 300 that is an instruction source. In S700, the storage node 200 serving as the lend-out destination is the node 200 having the shortage (the node 200 for which one of the results of steps S602 and S603 is "Yes"). In the instruction of performing lending out, information (for example, a node number) on the node 200 having the shortage may be specified as a parameter.

The shortage monitoring program (2) 237, which receives the report from the chunk lending out program 224, transmits to the node 200 having the shortage an instruction of allocating the chunks (S705). In this instruction, information on the lent out logical chunks (information stored in the logical chunk table 232 of the node 200 serving as the lend-out source) is specified as a parameter.

The chunk receiving program 225 of the node 200 registers the information on the lent out logical chunks in the logical chunk table 232 of the node 200 having the shortage that receives the instruction of allocating the chunks and reports completion thereof (S706). In S706, the chunk receiving program 225 checks available logical chunk numbers and stores in the logical chunk table 232 information (a node number (a master), a physical chunk number (a master), a node number (a mirror), a physical chunk number (a mirror), a size, and a number of a storage control unit of an allocation destination) passed as parameters in records identified by the logical chunk numbers.

Finally, the chunk receiving program 225 registers the lent out logical chunks 264 in the local pool 263 (S707) and terminates the processing (S708). In S707, the information on the logical chunks registered in the logical chunk table 232 in S706 is registered in the local pool table 228 of the node 200 having the shortage.

The shortage monitoring program (2) 237 that receives the report from the chunk receiving program 225 terminates the processing (S709).

The example of FIG. 17 describes the processing of lending out the logical chunks 264. However, the physical chunks 211 may be lent out. In this case, the node 200 having the shortage that receives the physical chunks 211 creates logical chunks 264 using a plurality of lent out physical chunks 211. The logical chunks are added to the node 200 having the shortage as the physical chunks 211 are lent out, which may be included in lending out of the logical chunks 264 in a broad sense.

The example of FIG. 17 shows an example of the management method for the lent out logical chunks and the management method for the received logical chunks, and other management methods except the described method may be used.

As described above, by taking FIG. 9 as an example, a local pool of 50 TB or more can be created for the case (3) or the case (4), and a write error can be avoided.

When there is a local pool 263 having the shortage of the registrable chunks as a result of the shortage monitoring program (1) 236 or the shortage monitoring program (2) 237, a size of chunks to be created thereafter may be changed. Therefore, the management node 300 may manage the size of the chunks to be created in the future. When a new node 200 is added to the storage system 160 or a new storage device 210 is added to the storage node 200, the chunk creation program 223 may be notified of the size of the chunks managed by the management node 300.

Chunks to be lent out (to be interchanged) may have a normal size instead of a large size. For example, when there is a shortage of the available capacity of the internal capacity of any node 200 except the node 200 having the shortage, the chunks (the logical chunks 264 or the physical chunks 211) to be lent out from any node 200 except the node 200 having the shortage may have a normal size.

Figure 18:
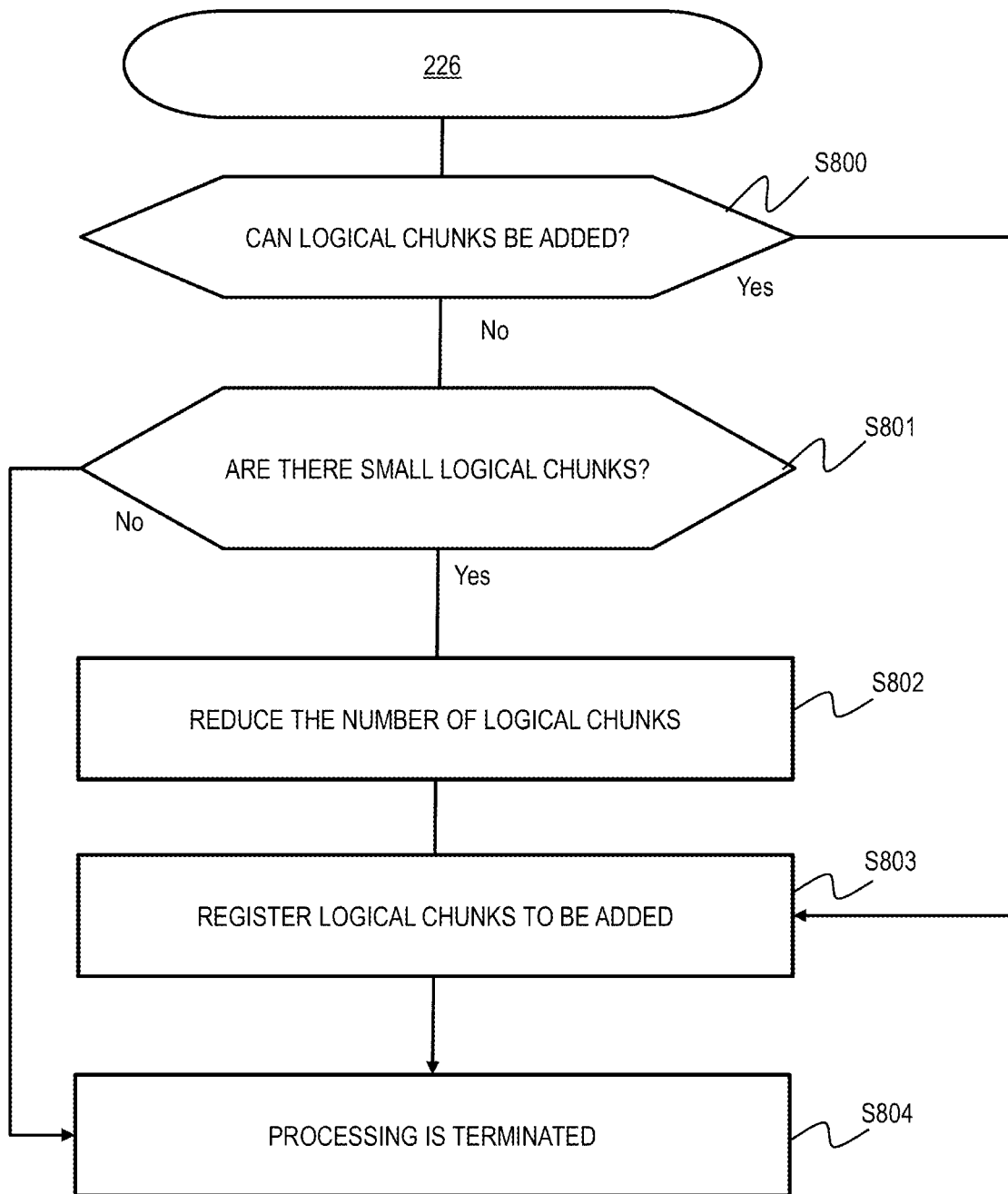
FIG. 18 shows an example of processing of a chunk exchange program.

FIG. 18 shows an example of processing of the chunk exchange program 226. When the number of logical chunks registered in the local pool 263 reaches the upper limit (when a record of the logical chunk cannot be added to the local pool table 228), the program 226 reduces the number of the registered logical chunks and registers other logical chunks having a large size, thereby increasing the capacity of the local pool 263. The program 226 is executed, for example, in place of step S406 of FIG. 15 or S707 of FIG. 17.

The chunk exchange program 226 determines whether the logical chunks 264 can be added to the local pool 263 (S800). This determination may be made by determining whether the number of records registrable in the local pool table 228 is N (N is an integer equal to or larger than 0). Other determination except this determination may be used.

When the logical chunks 264 can be added to the local pool 263 (S800: Yes), the chunk exchange program 226 adds the logical chunks 264 to be added to the local pool 263 (S803) and terminates the processing (S804).

On the other hand, when the logical chunks 264 cannot be added to the local pool 263 (S800: No), the chunk exchange program 226 determines whether there are registered logical chunks 264 smaller than the logical chunks 264 to be added (S801). A size of the logical chunks 264 to be added and a size of the logical chunks 264 registered in the local pool 263 are specified by the logical chunk table 232.

When there is no registered logical chunk 264 smaller than the logical chunks to be added (S801: No), the chunk exchange program 226 terminates the processing (S804).

When there are registered logical chunks smaller than the logical chunks to be added (S801: Yes), the chunk exchange program 226 reduces the number of the logical chunks from the local pool 263 (S802). In S802, the chunk exchange program 226 moves data stored in the logical chunks 264 to other logical chunks 264. Specifically, the chunk exchange program 226 specifies allocated pages of the logical chunks 264 based on the local pool table 228. The chunk exchange program 226 copies data stored in the specified pages onto pages in other logical chunks. The chunk exchange program 226 updates information on pages stored in the volume table 229, a page allocation state 606 of pages serving as a migration source, and a page allocation state 606 of pages serving as a migration destination. In order to reduce an amount of data to be copied, logical chunks having a smallest number of allocated pages may be selected as the logical chunks to be reduced.

Finally, the chunk exchange program 226 adds the logical chunks to be added to the local pool (S803) and terminates the processing (S804).

As described above, by taking FIG. 9 as an example, a local pool of 100 TB or more can be created for the case (1) or the case (2), and a write error can be avoided.

Figure 19:
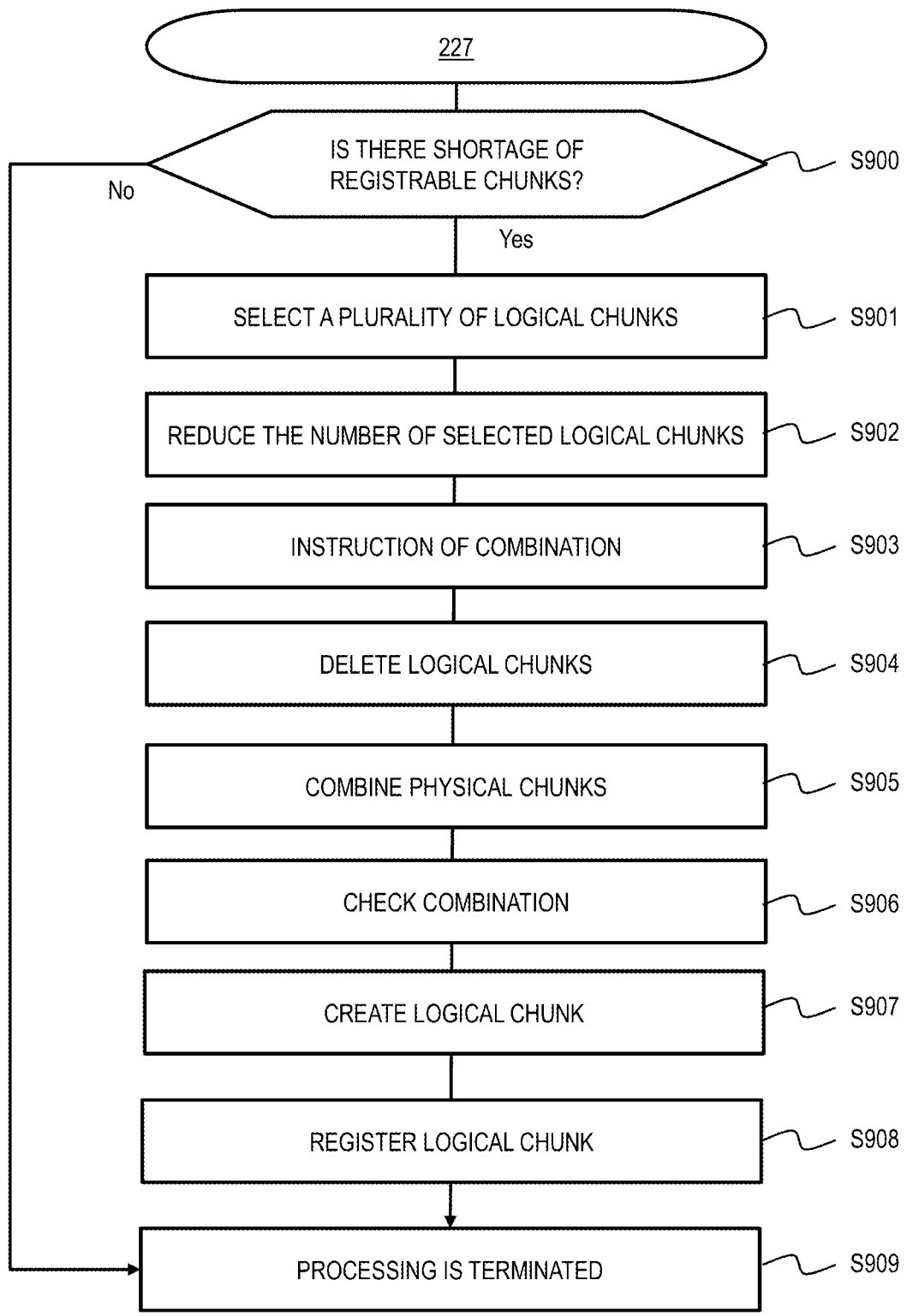
FIG. 19 shows an example of processing of a chunk combination program.

FIG. 19 shows an example of processing of the chunk combination program 227. When the number of chunks registered in the local pool 263 reaches an upper limit, the program 227 creates a new logical chunk 264 by combining a plurality of logical chunks 264 and registers the logical chunk 264 in the local pool 263.

The chunk combination program 227 checks whether there is a shortage of the chunks registrable in the local pool 263 (S900). When there is no shortage of chunks registrable in the local pool 263 (S900: No), the chunk combination program 227 terminates the processing (S909).

When there is a shortage of the chunks registrable in the local pool 263 (S900: Yes), the chunk combination program 227 selects the plurality of logical chunks 264 to be reduced from the local pool 263 (S901) and reduces the selected plurality of logical chunks 264 from the local pool 263 (S902). In order to facilitate combination of the physical chunks that occurs thereafter, the plurality of logical chunks 264 of which physical chunks 211 are sequential may be selected. The reduction processing is the same as S802 in FIG. 18.

Next, the chunk combination program 227 transmits an instruction of combining the chunks to the plurality of storage nodes 200 that have the plurality of physical chunks 211 associated with the plurality of logical chunks 264 (S903). The storage nodes 200 (that is, the plurality of storage nodes 200 that have the plurality of physical chunks 211 associated with the plurality of logical chunks 264 selected to be reduced) to be a transmission destination of the instruction of combining the chunks can be specified by referring to the logical chunk table 232. The storage nodes 200 that receive the notification execute steps S904 and S905 to combine the physical chunks 211. In the example of FIG. 19, since the storage nodes 200 that receive the notification have the physical chunks 211 associated with at least one of the logical chunks 264 to be reduced, steps S904 and S905 are executed.

The chunk combination program 227 deletes the logical chunks 264 (S904) and combines the physical chunks 211 (S905). The deletion of the logical chunks 264 is to delete records of the logical chunks to be reduced from the logical chunk table 232. In a case of the plurality of physical chunks having sequential addresses on the storage devices 210, the physical chunks can be easily combined by updating the size 404 (see FIG. 4) of a first physical chunk and deleting information on subsequent physical chunks. For example, when the physical chunks 0 and 1 are combined in the example of FIG. 4, the chunk combination program 227 updates the size 404 of a record of the physical chunk 0 to "200" and deletes a record of the physical chunk 1 from the physical chunk table 231. The plurality of non-sequential physical chunks can also be combined. For example, the chunk combination program 227 can perform combination by giving the same physical chunk number to different physical chunks 211 (that is, the physical chunk number is shared). Pointer information that associates records with each other to indicate associated physical chunks may be stored in the physical chunk table 231. For example, in the example of FIG. 4, when physical chunks 0 and 3 are combined, the chunk combination program 227 corrects the physical chunk number of the physical chunk 3 to "0". When the physical chunks are accessed, it is possible to specify the accessed record of the physical chunk table 231 using offsets in the chunks. It is also considered to perform combination by other methods.

The chunk combination program 227 checks completion of the combination of the physical chunks of the storage nodes 200 (S906) and creates a logical chunk using the combined physical chunks (S907). This processing is realized by registering records including information on the combined physical chunks in the logical chunk table 232. In S907, one logical chunk 264 of which a plurality of combined physical chunks are associated is generated.

Finally, the chunk combination program 227 registers the created logical chunk 264 in the local pool 263 (S908) and terminates the processing (S909). The registration of the created logical chunk 264 in the local pool 263 is realized by storing the logical chunk number 604, the page number 605, the page allocation state 606, and the allocation destination volume number 607 in the local pool table 228.

As described above, by taking FIG. 9 as an example, a local pool of 100 TB or more can be created for the case (1) or the case (2), and a write error can be avoided.

A similar effect can be obtained by creating a logical chunk having a large size without creating physical chunks having a large size, which is similar to FIG. 15. In step S905, the chunk combination program 227 stores information which associates the plurality of physical chunks with one logical chunk number in the logical chunk table 232.

The maintenance method A and the maintenance method B can be used in combination.

For the cases (2) and (4) of FIG. 9, the maintenance method A limits the maximum capacity of the volume that can be created to 50 TB (for the case (2)) or 25 TB (for the case (4)). The maximum capacity of the volume that can be created can be increased to 100 TB (for the case (2)) or 50 TB (for the case (4)) by using the interchange of a capacity and the volume migration that are shown in the maintenance method B. The API, the CLI or the GUI can be provided, which gives an instruction of increasing the maximum capacity of the volume that can be created. The instruction is received, and the maintenance method B such as the interchange of the capacity or the volume migration is executed. Which capacity the maximum capacity of the volume that can be created is increased to may be provided by the GUI or the CLI.

According to the comparative example described with reference to FIG. 9, the global pool 28 has the available capacity while the local pools 23 are in a shortage of the available capacities, so that a write failure may occur. If the capacity of the global pool 280 can also be made small when the capacities of the local pools 263 are small, the frequency of a write failure can be reduced. This is because, when the capacity of the global pool 280 is small, it is possible to promote a countermeasure such as adding a drive. This is a kind of the maintenance method B since available capacities of the local pools 263 increase by adding a drive.

In order to make the capacity of the global pool 280 small when the capacities of the local pools 263 are small, it is considered to equalize usage rates (the used capacity of the local pool 263+a total capacity of the local pool 263) of the local pools 263. The equalization makes a deviation small between the usage rates of the local pools 263 and a usage rate of the global pool 280. When the usage rates of the local pools 263 are low, the usage rate of the global pool 280 referred to by a user is also low.

Figure 21:
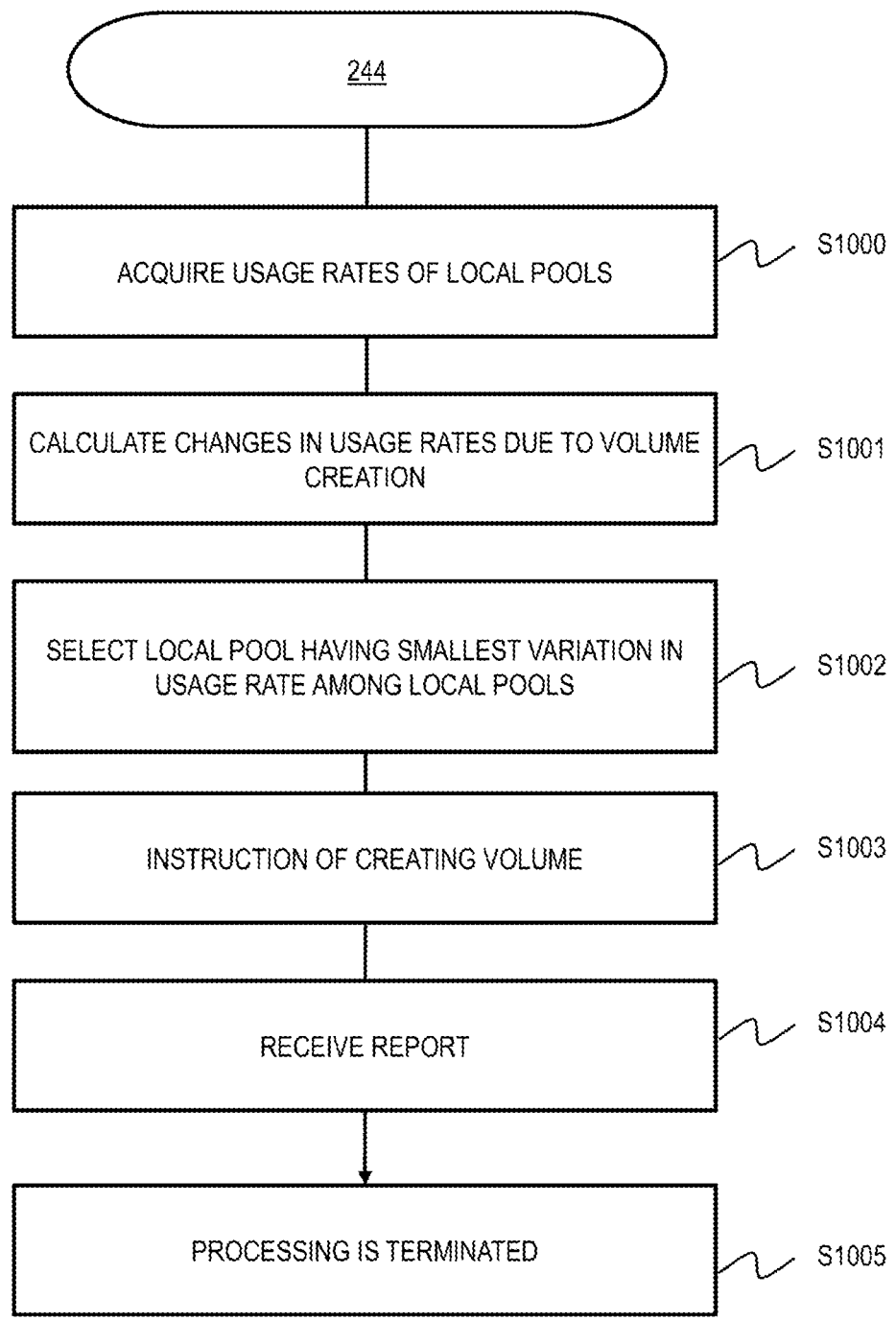
FIG. 21 shows an example of processing in a volume creation node determination program (2)

The usage rates of the local pools 263 can be equalized by selecting a volume creation node. FIG. 21 shows an example of processing in the volume creation node determination program (2).

The volume creation node determination program (2) acquires usage rates of the local pools 263 (S1000) and calculates changes in the usage rates after volume creation based on the acquired usage rates and a capacity of the created volume (S1001). Next, the volume creation node determination program (2) selects a local pool 263 having a smallest variation in usage rate (S1002) and makes an instruction of creating a volume in the selected local pool 263 (S1003). The selected local pool 263, for example, has the smallest variation (variation in usage rate) when it is assumed that the volume is created from the local pool 263. Finally, the volume creation node determination program (2) receives a volume creation completion report (S1004) and terminates the processing (S1005). The capacities of the local pools 263 are different, and accordingly this processing is different in a simple method for creating a volume in the local pool 263 having a smallest used capacity or the local pool 263 having a largest available capacity.

For the calculation in step S1001, it may be assumed that the same capacity as that of the volume to be created is consumed from the local pool 263 (hereinafter, the capacity of the local pool 263 may be referred to as a "physical capacity" as appropriate). A physical capacity consumed from the local pool 263 may be actually calculated in consideration of a ratio of an area where writing occurs to the size of the volume. The ratio of the area where the writing occurs may be a ratio calculated from a usage result of the node group 165, or may be a commonly known ratio. The usage rate of the local pool 263 after the volume creation can be calculated by adding the physical capacity consumed from the local pool 263 with the volume creation to a currently used capacity of the local pool 263.

For example, it is assumed that the physical capacity of 50% of the volume capacity being consumed is determined from the usage result of the node group 165. When a volume of 100 GB is created, consumption of a physical capacity of 50 GB is predicted, which is 50% of 100 GB. When a local pool capacity is 1000 GB and 500 GB has already been used, it can be predicted that a used capacity is 550 GB and a usage rate is 55% due to the volume creation. The consumed physical capacity may be calculated not only by writing from a server but also considering an effect of compression and de-duplication of data.

When there are a large number of newly created volumes in the local pools 263, currently used capacities of the local pools 263 may increase significantly. In this case, it is difficult to correctly calculate the usage rates after the volume creation.

For example, a case is considered where a capacity of a local pool is 1000 GB and 500 GB has already been used. When a consumed physical capacity is a volume of 10 GB in a created volume of 100 GB, the volume is likely to have a physical capacity of 40 GB to be consumed in the future.

To avoid this, assumed consumed physical capacities for the local pools 263 may be managed. During the volume creation, assumed consumed physical capacities of the volumes are added to assumed consumed physical capacities of the local pools 263 in which the volumes are created. The assumed consumed physical capacities of the local pools 263 can be used in the calculation of step S1001.

As a modification to promote a countermeasure such as adding a drive, a capacity of the local pool 263 having a highest usage rate may be provided to a user as the capacity of the global pool 280. In addition to the usage rate of the global pool 280, a usage rate of the local pool 263 having the highest usage rate may also be provided to a user. Both the provision of these usage rates and the selection of the node that creates the volume described above may be used. The usage rate of the local pool 263 may be an available capacity rate of the local pool. In this case, instead of the available capacity rate of the local pool 263 having a highest usage rate, an available capacity rate of the local pool 263 having a lowest available capacity rate can be provided to a user. For the local pool 263, the usage rate may be a ratio of the used capacity to the capacity of the local pool 263, and an available capacity ratio may be a value obtained by subtracting the usage rate from 1, in other words, a ratio of the available capacity to the capacity of the local pool 263.

The interchange of a chunk capacity and the volume migration have been described as a maintenance method. A configuration is considered in which a plurality of volumes 262 created from the local pools 263 are integrated, and a combined volume (hereinafter, referred to as a "combined volume") is provided to the hosts. In this configuration, a method of interchanging or migrating the volumes 262 before the combination among the storage nodes may be considered. For example, a combined volume of 300 GB is created by combining three volumes 262 each having 100 GB. The hosts 100 can recognize the combined volume of 300 GB and thereafter access the combined volume. Two or more volumes that constitute the combined volume may be in one node 200 or in two or more nodes 200.

An advantage of the volume migration will be described. In a case of the above-described volume migration, the migration may not be performed since the volume capacity is not constant. For example, when a volume 262 of 500 GB is migrated, the volume 262 cannot be migrated even when there is an available capacity of 200 GB in a certain storage node 200 and an available capacity of 300 GB in another storage node 200. In contrast, when there is a combined volume of 500 GB including a volume of 200 GB and a volume of 300 GB, the volume 262 of 500 GB can be migrated. When volumes 262 that constitute the combined volume has a fixed size, a small size or the like, migration to the storage node 200 having an available capacity is further facilitated.

An advantage of the interchange of the capacity will be described. When the physical chunks or the logical chunks are interchanged, the interchanged chunks are divided into a plurality of pages and allocated to the plurality of volumes. That is, data of the plurality of volumes 262 is stored in one chunk. Even when the available capacity of the storage node 200 increases due to deletion of the volume 262 or the like, the interchanged capacity stores data of other volumes. For this reason, it is difficult to return the interchanged chunks.

The term "return" means that the interchange is canceled. Processing such as evicting data from the chunks occurs. In contrast, when the combined volume is deleted, in a case where the volumes 262 that constitute the combined volume have capacities of other storage nodes 200, the interchanged chunks can be returned along with the deletion.

FIG. 22 shows an example of the combined volume table 246.

The combined volume table 246 is an example of information on the combined volume. The combined volume table 246 includes records for volumes that serve as components of the combined volume. Each record stores information such as a combined volume number 2201, a combined volume capacity 2202, a node number 2203, a volume number 2204, and a volume capacity 2205. Hereinafter, one volume is taken as an example (a "target volume" in the description of FIG. 22).

The combined volume number 2201 is a number that identifies the combined volume including a target volume as a component (a unique number in the storage system 160). The combined volume number 2201 may be a unique number in the storage system 160 by including a number of the combined volume itself and other information (for example, a node number). The combined volume capacity 2202 indicates a capacity of the combined volume including the target volume as a component. The node number 2203 indicates a number of the node 200 including the target volume. The volume number 2204 indicates a number of the target volume. The volume capacity indicates a capacity of the target volume. When the plurality of local pools 263 are included in the storage node 200, each record may store a local pool number.

In the example of FIG. 22, a combined volume 0 includes a volume 0 in a node 00 and a volume 1 and a volume 2 in a node 01. Each volume capacity is 100 GB, and thus a capacity of a combined volume is 300 GB.

Figure 23:
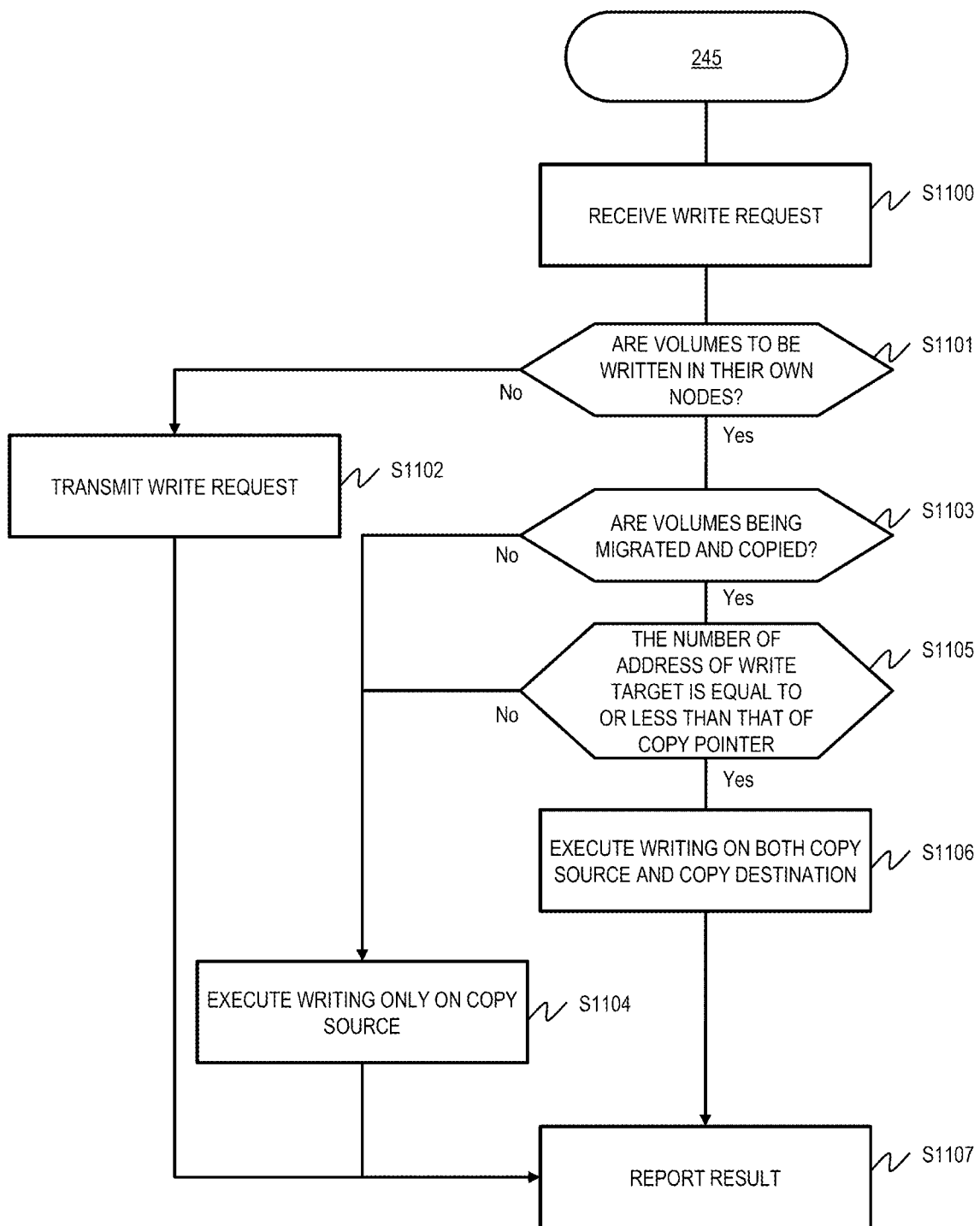
FIG. 23 shows an example of processing of a write program.

FIG. 23 shows an example of the write program 245.

When the volumes 262 that constitute the combined volume are disposed in other storage nodes 200, a write request is transferred to the storage nodes 200 including the volumes 262. When the volumes 262 that constitute the combined volume are migrated to other storage nodes 200, write processing is executed in accordance with the copy state. The write program 245 receives the write request to combine the volumes (S1100) and determines whether the volumes 262 to be written in are in their own nodes (S1101). In step S1101, the write program 245 calculates which address of which volume 262 that constitutes the combined volume corresponds to a write address of the write request. The write program 245 specifies the storage nodes 200 including the volumes 262 to be written in. These processing is realized by referring to the combined volume table 246.

When the volumes 262 to be written in are not in their own nodes (S1101: No), the write program 245 transfers the write request to other storage nodes 200 including the volumes 262 (S1102), receives a result of the write request, and reports the result to the hosts 100 (S1107).

When the volumes 262 to be written in are in their own nodes (S1101: Yes), the write program 245 determines whether the volumes 262 to be written in are being migrated and copied (S1103). When the migration and the copy are not in progress (S1103: No), the write program 245 executes the write processing on the volumes 262 to be written in (S1104) and reports a result to the hosts 100 (S1107). On the other hand, when the migration and the copy are in progress (S1103, Yes), the write program 245 determines whether the number of an address of a write target is equal to or less than that of a copy pointer (a pointer indicating an address where current copy have been completed) (S1105). The copy pointer indicates a larger number as the migration and the copy proceed.

When the number of the address of the write target is larger than that of the copy pointer (S1105: No), the write program 245 executes the write processing on the volumes 262 to be written in (S1104). When the number of the address of the write target is equal to or less than that of the copy pointer (S1105: No), the write program 245 executes the write processing on both a copy source and a copy destination. This is because the copy source and the copy destination are the same after the copy processing is terminated. Finally, the write program 245 reports a result to the hosts 100 (S1107).

In the copy processing, the volumes 262 that constitute the combined volume are migrated to another storage node 200. The available capacity of the storage node 200 can be increased by the copy processing. In the volume migration described in FIG. 16, the volumes 262 recognized by the hosts are migrated. However, in the migration described here, the volumes 262 that constitute the combined volume are migrated.

Contents of the copy processing will be described. The copy processing is started by a program that detects a shortage of the capacity, for example, the shortage monitoring program (1) 236 or the shortage monitoring program (2). At this time, a number of the volume 262 serving as a migration source (a copy source), a number of the storage node serving as a migration destination (a copy destination), and a number of the local pool serving as the migration destination are specified. First, the volume 262 serving as the migration destination is created in the local pool serving as the migration destination in the storage node 200 serving as the migration destination. The volume of the migration destination may be created by a program that starts the copy processing. In the copy processing, until the copy pointer indicates an end address, data is repeatedly read from a volume of a migration source in an area to which the address indicated by the copy pointer belongs and the read data is written to the volume of the migration destination; meanwhile, the copy pointer repeatedly advances. The area to which the address indicated by the copy pointer belongs is, for example, a processing unit of the copy that is 1 MB. After all the volumes are copied, the combined volume table 246 is updated. Specifically, the node number 2203 and the volume number 2204 are updated to a node number and a volume number of the volume of the migration source.

In the read processing, when the volumes to be read are in their own storage nodes 200, the read processing is executed on the volumes 262 of their own local storage nodes 200. When the volumes 262 to be read are in other storage nodes 200, the read processing is realized by transferring a read request to other storage nodes 200. The read processing includes processing steps corresponding to steps S1100, S1101, S1102, S1104, S1107 of FIG. 23. It should be noted that the "write" in the steps can be read as the "read".

The capacity information provided to a user includes, for example, information including one or more of the following information elements:
  the capacity of the global pool (the total capacity of the local pools);
  the capacity of the global pool in the specification (the product of the maximum capacity of the local pool in the specification and the number of local pools);
  the used capacity of the global pool;
  the available capacity of the global pool;
  the maximum capacity of the volume that can be created (the capacity calculated based on the capacity obtained by subtracting the used capacity of the local pool from the capacity of the local pool);
  the maximum capacity of the volume that can be created (the capacity calculated based on the capacity obtained by subtracting the used capacity of the local pool from the maximum capacity of the local pool in the specification);
  the expandable capacity of the maximum capacity of the volume that can be created;
  the maximum usage rate among the usage rates of the local pools, and
  the minimum available capacity rate among the available capacity rates of the local pools.

The term "expandable capacity of the maximum capacity of the volume that can be created" refers to a capacity that can be added to the maximum capacity of the volume that can be created by the volume migration or the interchange of the capacity. Capacity information including these information elements can be provided to a user via an interface such as the API, the CLI, and the GUI. The available capacity of the local pool is based on the capacity obtained by subtracting the used capacity of the local pool from the capacity of the local pool or the capacity obtained by subtracting the used capacity of the local pool from the maximum capacity of local pool in the specification.

The maximum capacity of the volume that can be created can be used to improve a utilization rate of processor resources. For example, it is assumed that there are three storage nodes 200 each having a capacity of 100 GB. At this time, one storage node can create a volume 262 of 200 GB and provide the volume 262 to the hosts 100 by using the interchange of the capacity or the combined volume described in FIG. 17 or FIG. 22. However, the storage node serving as an I/O issuing destination (an issuing destination of an I/O request) of the hosts 100 is only the storage node 200 that provides the volume 262, and processor resources of other storage nodes 200 cannot be used effectively. Three volumes 262 each having 100 GB can be created and disposed in the storage nodes 200 by providing 100 GB to a user as the maximum capacity of the volume that can be created. In this case, the I/O issuing destinations of the hosts 100 are all storage nodes 200, and the utilization rate of the processor resources can be increased.

Whether to apply the embodiment of the invention may be set on a system basis or the like. In order to realize this, an interface for such setting is provided. When the embodiment of the invention is applied, the volume creation processing, the volume capacity acquisition program, and the like according to the present embodiment are performed. Other units such as a global pool unit and a local pool unit may be set instead of the system. Accordingly, a user can select either to prevent a volume having a large size (the volume having the capacity larger than the capacity answered by the storage system 160) or to generate a write error. Regarding the maintenance method B, an interface may be provided for creating the chunk having a large size or not.

Operation may be changed by a thin provisioning volume and a thick provisioning volume. When the thin provisioning volume is used, it is desirable to create a volume having a large size by using thin provisioning, for example, when it is difficult to predict an amount of data in the future. In this case, a constraint on a capacity that can be created as in the maintenance method A may be not allowed. For this reason, it is considered to use the maintenance method A only when the thick provisioning volume is created. The thick provisioning may also include full allocation specification for the thin provisioning. An interface for a user to specify operation of the thick provisioning and the thin provisioning may be provided.

As described above, while the invention has been described with reference to an embodiment, the invention is not limited thereto. Various modifications can be made without departing from the gist of the invention.

What is claimed is:

1. A storage system comprising:
a node group configured with a plurality of storage nodes that each includes a storage device unit which is one or more storage devices, wherein
each of the plurality of storage nodes includes a local pool that is a logical storage area based on the storage device unit of the storage node,
the node group provides a global pool that is a logical storage area based on a plurality of local pools of the plurality of storage nodes,
each of the plurality of storage nodes stores data stored in a volume provided by the storage node in the local pool of the storage node,
for any storage node, a capacity relationship is maintained in which a capacity of a volume created by the storage node is less than an available capacity of a local pool of the storage node, and
a storage node that creates the volume is selected by a storage management unit which manages the node group, wherein the storage management unit combines first and second volumes to provide a combined volume having a capacity that is larger than a capacity of each of the first and second volumes,
wherein
maintaining the capacity relationship is to create and provide a combined volume, and
the combined volume is a volume in which two or more volumes are combined and which has a capacity equal to or larger than capacities of the two or more volumes; and wherein
each of the plurality of local pools is configured with one or more logical chunks in the storage node that includes the local pool, and wherein in the case that a number of logical chunks in the storage node is within a predetermined number from an upper limit, chunks that are added to the storage node are logical chunks having a larger size than logical chunks that are added to the storage node in a case wherein the number of logical chunks that are added to the storage node is less than the predetermined number from the upper limit.

2. The storage system according to claim 1, wherein the available capacity of the local pool is based on a capacity obtained by subtracting a used capacity of the local pool from a capacity of the local pool, or based on a capacity obtained by subtracting the used capacity of the local pool from a maximum capacity of the local pool in a specification.

3. The storage system according to claim 1, wherein maintaining the capacity relationship is to provide a maximum available capacity among a plurality of available capacities of the plurality of local pools.

4. The storage system according to claim 3, wherein a storage node that serves as a creation destination of a volume having a capacity requested after the maximum available capacity is provided is any storage node having an available capacity equal to or larger than the requested capacity.

5. The storage system according to claim 4, wherein when the requested capacity is larger than an available capacity of the storage node that serves as the creation destination, an error is returned from the storage node that serves as the creation destination.

6. The storage system according to claim 3, wherein the maximum available capacity is provided as at least one of a maximum value of a capacity of a volume that can be created and an available capacity of the global pool.

7. The storage system according to claim 1, wherein each of the plurality of local pools is configured with one or more logical chunks in a storage node that includes the local pool, and
maintaining the capacity relationship is to add one or more logical chunks to a certain local pool.

8. The storage system according to claim 7, wherein at least one of the added one or more logical chunks is based on a capacity interchanged from at least one storage node except a storage node that includes the certain local pool.

9. The storage system according to claim 1, wherein maintaining the capacity relationship is to migrate at least one volume associated with a certain local pool to a local pool having an available capacity larger than an available capacity of the certain local pool.

10. The storage system according to claim 1, wherein each of the plurality of storage nodes has an upper limit to the number of logical chunks that constitute the local pool of the storage node, and
maintaining the capacity relationship is to set, instead of two or more logical chunks that are a part of a certain local pool, a logical chunk that has a size larger than each of the two or more logical chunks and stores data which is in the two or more logical chunks as a component of the local pool.

11. The storage system according to claim 8, wherein the capacity relationship is maintained when a condition is satisfied under which an available capacity of an internal capacity is in a shortage, the internal capacity being provided in the storage node that includes the certain local pool and being a base capacity of the certain local pool.

12. The storage system according to claim 1, wherein maintaining the capacity relationship is to provide a maximum usage rate among a plurality of usage rates respectively corresponding to the plurality of local pools, or provide a minimum available capacity rate among a plurality of available capacity rates respectively corresponding to the plurality of local pools,
a usage rate of each local pool is a ratio of a used capacity to a capacity of the local pool, and
an available capacity rate of each local pool is a ratio of an available capacity to the capacity of the local pool.

13. The storage system of claim 1
wherein
the storage node selected by the storage management unit has a smallest variation in a plurality of usage rates respectively corresponding to the plurality of local pools,
each of the plurality of usage rates of each storage node is estimated when it is assumed that the storage node is selected,
a usage rate of each local pool is a ratio of a used capacity to a capacity of the local pool.

14. The storage system of claim 1, wherein said capacity of a volume is a size of said volume.

15. The storage system of claim 1, wherein said capacity of a volume is a used capacity of said volume.

16. A storage control method comprising:
configuring a node group with a plurality of storage nodes that each includes a storage device unit which is one or more storage devices, wherein
providing by each of the plurality of storage nodes a local pool that is a logical storage area based on the storage device unit of the storage node,
providing by the node group a global pool that is a logical storage area based on a plurality of local pools of the plurality of storage nodes,
storing by each of the plurality of storage nodes data in a volume provided by the storage node in the local pool of the storage node,
maintaining for any storage node, a capacity relationship in which a capacity of a volume created by the storage node is equal to or less than an available capacity of a local pool of the storage node, and
selecting by a storage management unit which manages the node group the storage node that creates a volume; wherein
the storage node selected by the storage management unit has a smallest variation in a plurality of usage rates respectively corresponding to the plurality of local pools,
each of the plurality of usage rates of each storage node is estimated when it is assumed that the storage node is selected,
a usage rate of each local pool is a ratio of a used capacity to a capacity of the local pool, and
maintaining the capacity relationship is to create and provide a combined volume, and
the combined volume is a volume in which two or more volumes are combined and which has a capacity larger than a sum of individual capacities of the two or more volumes, and
each of the plurality of local pools is configured with one or more logical chunks in the storage node that includes the local pool, and wherein in the case that a number of logical chunks in the storage node is within a predetermined number from an upper limit, chunks that are added to the storage node are logical chunks having a larger size than logical chunks that are added to the storage node in a case wherein the number of logical chunks that are added to the storage node is less than the predetermined number from the upper limit.

17. A storage control method comprising:
specifying an available capacity of a local pool in a certain storage node among a plurality of storage nodes which constitute a node group;
providing, by each of the plurality of storage nodes, a storage device unit that is one or more storage devices and is a base of a local pool;
providing, by the node group, a global pool that is a logical storage area based on a plurality of local pools respectively included in the plurality of storage nodes;
storing, by each of the plurality of storage nodes, data stored in a volume provided by the storage node in the local pool of the storage node;
selecting, by a storage management unit that manages the node group, the storage node that creates a volume,
maintaining a capacity relationship in which a capacity of a volume created by the certain storage node is equal to or less than the specified available capacity;
wherein
maintaining the capacity relationship is to create and provide a combined volume, and
the combined volume is a volume in which two or more volumes are combined and which has a capacity equal to or larger than capacities of the two or more volumes;
selecting by a storage management unit which manages the node group, a storage node that creates the volume, wherein the storage management unit combines first and second volumes to provide a combined volume having a capacity that is larger than a capacity of each of the first and second volume; and
wherein
each of the plurality of local pools is configured with one or more logical chunks in the storage node that includes the local pool, and wherein in the case that a number of logical chunks in the storage node is within a predetermined number from an upper limit, chunks that are added to the storage node are logical chunks having a larger size than logical chunks that are added to the storage node in a case wherein the number of logical chunks that are added to the storage node is less than the predetermined number from the upper limit.

* * * * *